(12) United States Patent
Mikhailov et al.

(10) Patent No.: US 12,493,278 B2
(45) Date of Patent: Dec. 9, 2025

(54) SYSTEM AND METHOD FOR ANALYZING SENSED DATA IN 3D SPACE

(71) Applicant: EXPLORATION ROBOTICS TECHNOLOGIES INC., Houston, TX (US)

(72) Inventors: Oleg Mikhailov, Piedmont, CA (US); Richard Clarke, Houston, TX (US); Dmitri Kossakovski, S. Pasadena, CA (US)

(73) Assignee: EXPLORATION ROBOTICS TECHNOLOGIES INC., Houston, TX (US)

( * ) Notice: Subject to any disclaimer, the term of this patent is extended or adjusted under 35 U.S.C. 154(b) by 375 days.

(21) Appl. No.: 18/035,064

(22) PCT Filed: Aug. 5, 2021

(86) PCT No.: PCT/US2021/044685
§ 371 (c)(1),
(2) Date: May 2, 2023

(87) PCT Pub. No.: WO2022/098407
PCT Pub. Date: May 12, 2022

(65) Prior Publication Data
US 2024/0004367 A1 Jan. 4, 2024

Related U.S. Application Data

(60) Provisional application No. 63/109,013, filed on Nov. 3, 2020.

(51) Int. Cl.
*G05B 19/4099* (2006.01)
*G06F 30/12* (2020.01)

(52) U.S. Cl.
CPC ......... *G05B 19/4099* (2013.01); *G06F 30/12* (2020.01)

(58) Field of Classification Search
None
See application file for complete search history.

(56) References Cited

U.S. PATENT DOCUMENTS 7,357,179 B2 4/2008 Zheng et al.
8,242,445 B1 8/2012 Scanlon et al.
(Continued)

FOREIGN PATENT DOCUMENTS

CA 3039506 A1 4/2018
EP 3996058 A1 5/2022
(Continued)

OTHER PUBLICATIONS

Extended European Search Report for European Patent Application No. 21889774.2, mailed Sep. 19, 2024, 11 pages.
(Continued)

*Primary Examiner* — Alvaro E Fortich
*Assistant Examiner* — Carl F. R. Tchatchouang
(74) *Attorney, Agent, or Firm* — Withrow + Terranova, PLLC; Vincent K. Gustafson

(57) ABSTRACT

A method for collocating sensed data of one or more three-dimensional objects, the method comprising: autonomously collocating, with a processor, a first data set resulting in a first collocated data set, which may correspond with one or more first three-dimensional working models of the one or more three-dimensional objects, respectively; and autonomously interpreting, by a processor, the first collocated data set, by comparison to one or more pre-fabricated three-dimensional models, to determine an identity of the one or more three-dimensional objects associated with the one or more first three-dimensional working models or to deter- (Continued)

mine the state and/or operating conditions of three-dimensional objects.

22 Claims, 11 Drawing Sheets

(56) References Cited

U.S. PATENT DOCUMENTS

| | | | |
|---|---|---|---|
| 8,625,854 | B2 | 1/2014 | Valkenburg et al. |
| 8,872,818 | B2 | 10/2014 | Freeman et al. |
| 8,929,176 | B2 | 1/2015 | Debrunner et al. |
| 8,942,062 | B2 | 1/2015 | Debrunner et al. |
| 9,082,015 | B2 | 7/2015 | Christopulos et al. |
| 9,129,355 | B1 | 9/2015 | Harvey et al. |
| 9,262,789 | B1 | 2/2016 | Tofte |
| 9,607,370 | B2 | 3/2017 | Freeman |
| 9,619,691 | B2 | 4/2017 | Pang et al. |
| 9,672,446 | B1* | 6/2017 | Vallespi-Gonzalez ........... H04N 13/239 |
| 9,709,394 | B2 | 7/2017 | Schoner et al. |
| 10,055,831 | B2 | 8/2018 | Loveland et al. |
| 10,108,867 | B1 | 10/2018 | Vallespi-Gonzalez et al. |
| 10,127,685 | B2 | 11/2018 | Qian et al. |
| 10,186,049 | B1 | 1/2019 | Boardman et al. |
| 10,260,875 | B2 | 4/2019 | Schoner et al. |
| 10,351,240 | B1 | 7/2019 | Sills et al. |
| 10,586,385 | B2 | 3/2020 | Moghadam et al. |
| 10,846,511 | B2* | 11/2020 | Ozkucur ............. G06F 18/22 |
| 10,913,154 | B2 | 2/2021 | Tan et al. |
| 11,435,746 | B1 | 9/2022 | Ebrahimi et al. |
| 2001/0022614 | A1 | 9/2001 | Lida et al. |
| 2009/0138140 | A1 | 5/2009 | Pinney |
| 2014/0067333 | A1 | 3/2014 | Rodney et al. |
| 2014/0267627 | A1 | 9/2014 | Freeman et al. |
| 2014/0270492 | A1 | 9/2014 | Christopulos et al. |
| 2016/0019108 | A1 | 1/2016 | Banerjee |
| 2017/0028561 | A1 | 2/2017 | Yamada |
| 2017/0322551 | A1 | 11/2017 | Zang |
| 2018/0002010 | A1 | 1/2018 | Bauer et al. |
| 2018/0095458 | A1 | 4/2018 | Sharber |
| 2018/0130196 | A1 | 5/2018 | Loveland et al. |
| 2018/0321692 | A1 | 11/2018 | Castillo-Effen et al. |
| 2018/0329433 | A1 | 11/2018 | Zhao et al. |
| 2018/0329904 | A1 | 11/2018 | Gupta et al. |
| 2019/0066283 | A1 | 2/2019 | Gros et al. |
| 2019/0096069 | A1 | 3/2019 | Qian et al. |
| 2019/0108396 | A1 | 4/2019 | Dal Mutto et al. |
| 2019/0145765 | A1* | 5/2019 | Luo .................. G06V 10/764 702/153 |
| 2019/0188521 | A1 | 6/2019 | Barzelay et al. |
| 2019/0242696 | A1 | 8/2019 | McAleenan et al. |
| 2019/0248487 | A1* | 8/2019 | Holtz ................ G06V 20/17 |
| 2019/0253623 | A1 | 8/2019 | Lim et al. |
| 2020/0019167 | A1 | 1/2020 | Alshamrani et al. |
| 2020/0045880 | A1 | 2/2020 | Letsky |
| 2020/0066034 | A1 | 2/2020 | Tham et al. |
| 2020/0082168 | A1 | 3/2020 | Fathi et al. |
| 2020/0174129 | A1 | 6/2020 | Abdelkader et al. |
| 2020/0219234 | A1 | 7/2020 | Sotodate |
| 2020/0279320 | A1 | 9/2020 | Stewart |
| 2020/0306969 | A1 | 10/2020 | Bryner et al. |
| 2020/0333466 | A1* | 10/2020 | Hansen ............... G05D 1/0219 |
| 2020/0401138 | A1 | 12/2020 | Rentz et al. |
| 2021/0357664 | A1 | 11/2021 | Kocer et al. |
| 2022/0004672 | A1 | 1/2022 | Santarone et al. |
| 2022/0024577 | A1 | 1/2022 | Stamatovski |
| 2022/0050461 | A1 | 2/2022 | Karacholios et al. |
| 2022/0107977 | A1 | 4/2022 | Marthouse et al. |
| 2022/0157136 | A1 | 5/2022 | Metzler et al. |
| 2022/0383128 | A1 | 12/2022 | Gonzales et al. |
| 2023/0055428 | A1* | 2/2023 | Nordell .............. G05B 19/4097 |
| 2023/0079054 | A1 | 3/2023 | Mikhailov et al. |
| 2023/0221695 | A1 | 7/2023 | Shao et al. |
| 2024/0201240 | A1 | 6/2024 | Blanc-Paques et al. |
| 2024/0361124 | A1 | 10/2024 | Michini et al. |

FOREIGN PATENT DOCUMENTS

| | | |
|---|---|---|
| JP | 2004005449 A | 1/2004 |
| WO | 2016033797 A1 | 3/2016 |
| WO | 2020/088739 A1 | 5/2020 |
| WO | 2022/098407 A1 | 5/2022 |

OTHER PUBLICATIONS

Applicant-Initiated Interview Summary for U.S. Appl. No. 17/735,563, mailed Aug. 14, 2024, 4 pages.
International Search Report and Written Opinion mailed on Nov. 3, 2022 for International Application PCT/US2021/044685.
European Search Report, EP Application No. EP22194426 dated Jan. 13, 2023.
International Preliminary Report on Patentability for International Patent Application No. PCT/US2021/044685, mailed Jan. 18, 2024, 32 pages.
Office Action for Canadian Patent Application No. 3172561, mailed Oct. 27, 2023, 9 pages.
European Search Report for European Patent Application No. 22194426.7, mailed Jan. 23, 2023, 11 pages.
Non-Final Office Action for U.S. Appl. No. 17/735,563, mailed Aug. 18, 2022, 10 pages.
Final Office Action for U.S. Appl. No. 17/735,563, mailed Sep. 23, 2022, 10 pages.
Applicant-Initiated Interview Summary for U.S. Appl. No. 17/735,563, mailed Oct. 21, 2022, 2 pages.
Non-Final Office Action for U.S. Appl. No. 17/735,563, mailed Feb. 2, 2023, 63 pages.
Applicant-Initiated Interview Summary for U.S. Appl. No. 17/735,563, mailed May 4, 2023, 4 pages.
Final Office Action for U.S. Appl. No. 17/735,563, mailed Jun. 14, 2023, 106 pages.
Applicant-Initiated Interview Summary for U.S. Appl. No. 17/735,563, mailed Sep. 13, 2023, 4 pages.
Non-Final Office Action for U.S. Appl. No. 17/735,563, mailed Mar. 14, 2024, 123 pages.
Notice of Allowance and Examiner-Initiated Interview Summary for U.S. Appl. No. 17/735,563, mailed Jan. 6, 2025, 19 pages.

* cited by examiner

SYSTEM AND METHOD FOR ANALYZING SENSED DATA IN 3D SPACE

CROSS-REFERENCE TO RELATED APPLICATION(S)

This application is the U.S. national phase under 35 U.S.C. § 371 of International Application No. PCT/US2021/044685 filed on Aug. 5, 2021, and claims the benefit of U.S. Provisional Patent Application No. 63/109,013 filed on Nov. 30, 2020, wherein the entire disclosures of the foregoing applications are hereby incorporated by reference herein.

FIELD

The present teachings generally relate to a system and method for collocating sensed data of one or more three-dimensional objects. The system and method may be particularly advantageous in assisting the comparison of similarities and/or differences of three-dimensional objects between different times or the comparison and/or differences in the state or operating conditions of three-dimensional objects between different times.

BACKGROUND

Inspections of manufactured articles, equipment, facilities, and the like is conventionally performed in-person, by inspectors. Inspectors use various senses such as sight, touch, hearing, and smell to observe various characteristics of objects. In addition, inspectors sometimes use specialized metrology equipment to measure various physical characteristics of the objects. However, in-person inspection is a time-consuming process that involves an inspector traveling to various locations, traversing an entire facility, observing many different objects, recording observations, and attributing each observation to a specific object. Physiological observations, such as those related to sight, touch, hearing, and smell are also prone to human error and cannot be precisely compared between different days and between different observers. Furthermore, specialized metrology equipment can be subject to limitations in data volume because captured data is normally confined to small areas on the surfaces of objects. A single measurement on a single surface provides limited insight as to physical characteristics of objects as a whole. It is often impractical to capture data of an entire object that is large or complex from various positions and/or angles. Even if data is captured of an entire object, organizing data to recall which particular data point was obtained from a particular surface of an object takes care, attention, and an abundance of time. The investment in time grows even larger if many of such objects must be inspected and if many different types of measurements must be recorded for each and every object or if the object must be inspected repeatedly at different times. Because of the amount of human labor involved in inspections, they can be time consuming and costly.

Extrapolating useful information from the aforementioned inspections can be an arduous process. Inspectors generally review all of their notes, pick out relevant details, cross-reference some details with others in order to confirm their conclusions, and generate summarized reports that distill an abundance of observed information into comprehensively manageable briefs. This endeavor can be further complicated if objects are repeatedly inspected at various subsequent points in time. In this case, sometimes inspectors must cross-reference notes from current inspections with notes from one or more preceding inspections in order to glean similarities and differences between the temporally distinct inspections. In some instances, missing details can spoil some or all of the data. For example, if the identity of an object is not recorded, then all of the data associated with said subject loses meaning because issues cannot be traced back to their source. Furthermore, the accuracy of anomaly detection can vary widely. Inspector's observations may be prone to human error (e.g., overlooking details) or the detection of certain anomalies may be outside of the capabilities of the inspector's senses, or the metrology equipment employed.

Digital measurement recording can provide a wealth of information. However, an increased volume of information may not be without certain limitations. The more information that must be recorded, processed, and analyzed, the larger the digital file sizes and consequently the longer it takes to transmit data between computing devices, process the data, and render visualizations of the data. Furthermore, data storage, whether provided locally or by cloud services, can be expensive. In the case where a historical database of many prior inspections is typically maintained, the costs of maintaining the database can become unmanageable and/or a financial burden.

It would be desirable to provide a system and method that autonomously performs inspections. It would be desirable to provide a system and method that autonomously performs operations on sensed data to distill the data into an easily comprehensible format to aid inspectors in their review. It would be desirable to provide a system and method that utilizes multiple types of sensors that capture data that would otherwise be obtained through physiological observations and specialized metrology equipment. It would be desirable to provide a system and method that collocates sensed data in order to associate multiple types of data points with points in physical space on and/or in an object. It would be desirable to provide a system and method that can autonomously identify objects by comparisons of collocated data. It would be desirable to provide a system and method that cross-references two or more different, temporally distinct inspections and indicates to users the similarities and differences of objects between inspections. It would be desirable to provide a system and method that cross-references collocated data with pre-engineered digital models and indicates to users the similarities and differences of objects as compared to the pre-engineered digital models. It would be desirable to provide a system and method that processes data in substantially real-time, after data collection, in order to manage the time, cost, and hardware demands of data transmission, processing, and visualization. It would be desirable to provide a system and method that performs calculations and/or corrections on data to produce accurate and precise digital models of objects. The present application is directed towards a system and method for achieving one or any combination of the above desired objectives.

SUMMARY

The present disclosure relates to a method for analyzing sensed data of one or more three-dimensional objects, which may satisfy at least some of and possibly all the desired objectives above, the method may comprise: autonomously collocating, with a processor, a first data set resulting in a first collocated data set, which may correspond with one or more first three-dimensional working models of the one or more three-dimensional objects, respectively; and autonomously interpreting, by a processor, the first collocated data set, by comparison to one or more pre-fabricated three-dimensional models, to determine an identity of the one or more three-dimensional objects associated with the one or more first three-dimensional working models.

While the collocating step and/or interpreting step may be recited herein together with other steps, not all steps are necessary or essential to be employed with the collocating step and/or interpreting step.

The method may include autonomously acquiring a first data set at a first time using a plurality of sensors that may each acquire the first data set from a plurality of different positions of the plurality of sensors relative to one or more points in physical space on the one or more three-dimensional objects. The first data set may be associated with a first plurality of attributes of the one or more three-dimensional objects. The method may include autonomously acquiring a second data set at a second time using the plurality of sensors that may each acquire the second data set from a plurality of different positions of the plurality of sensors relative to the one or more points in physical space on the one or more three-dimensional objects. The second data set may be associated with a second plurality of attributes of the one or more three-dimensional objects.

The method may include autonomously collocating, by the processor, the second data set resulting in a second collocated data set, which may correspond with one or more second three-dimensional working models of the one or more three-dimensional objects. The method may include autonomously interpreting, by the processor, the second collocated data set, by comparison to the one or more pre-fabricated three-dimensional models and/or the one or more first three-dimensional working models, to determine the identity of the one or more three-dimensional objects associated with the one or more second three-dimensional working models.

The method may include autonomously comparing, by the processor, the first collocated data set and the second collocated data set, respectively associated with a matching identity of the one or more three-dimensional objects to determine the existence of similarities and/or differences between the first collocated data set and the second collocated data set and thereby may determine the existence of similarities and/or differences between the first plurality of attributes and the second plurality of attributes.

The method may include optionally, repeating any of the above steps recited in this and the prior paragraphs for one or more iterations. The second data set may comprise data sets acquired last-in-time and the first data set may comprise data sets acquired prior to the data set acquired last-in-time. A user may be alerted to the differences in the one or more three-dimensional objects between the first time and the second time.

The present disclosure relates to a system for collocating sensed data of one or more three-dimensional objects, which may satisfy at least some or possibly all of the desired objectives identified above, the system comprising one or any combination of: one or more sensor apparatuses; one or more processors; and one or more non-transitory storage media. The one or more sensor apparatuses may comprise a plurality of sensors.

DETAILED DESCRIPTION

Figure 1:
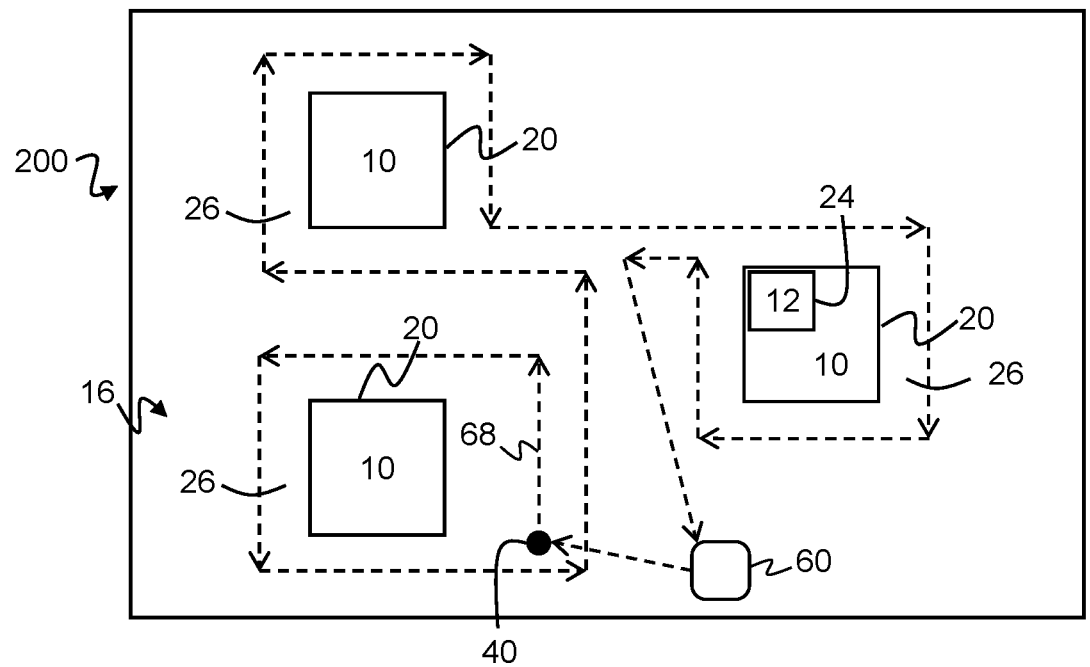
FIG. 1 shows a plan view of a roving operation of a sensor apparatus.

The present teachings meet one or more of the above needs by the improved system and method described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Introduction

The present disclosure provides for a system and method of collocating sensed data of one or more three-dimensional objects and a data collection and processing system for performing the method. The data collection and processing system may include one or more sensor apparatuses comprising a plurality of sensors. The plurality of sensors may capture data associated with one or more three-dimensional objects. The data collection and processing system may comprise one or more processors that carry out computer-readable instructions corresponding to the method of the present disclosure. The computer-readable instructions may be stored on one or more non-transitory storage media. The method of the present disclosure may be carried out by the data collection and processing system. All or at least part of the method may be performed autonomously, in real-time, or both. All or at least part of the method may be free of user direction and/or interaction. The system and method may provide users with visual reproductions of three-dimensional objects accompanied by visual indicators that convey similarities and/or differences of an object between two temporally distinct inspections.

Three-Dimensional Object

The present disclosure provides for a method of collocating and analysis of sensed data of one or more three-dimensional objects ("objects"). The one or more three-dimensional objects may include one or more manufactured objects. The manufactured object may include one or more consumer articles, industrial equipment, residential facilities, commercial facilities, resource supply infrastructures, transportation infrastructures, the like, or any combination thereof.

The consumer articles may include any article ("product") commercially available to consumers. The consumer articles may include vehicles, household appliances, furniture, construction equipment, the like, or any combination thereof.

The industrial equipment may include any equipment commercially available to businesses. For example, the industrial equipment may include metalworking machines (e.g., computer numerical control (CNC) machines), robotic automation systems, HVAC units, conveyors, ovens, coolers, compressed air tanks, the like, or any combination thereof.

The residential facilities may include any type of residential dwelling. The residential facilities may include apartment buildings, condominiums, houses, the like, or any combination thereof.

The commercial facilities may include any type of facility used in the course of business. For example, the commercial facilities may include office buildings, retail buildings, restaurants, manufacturing factories, chemical factories, laboratories, natural resource extraction facilities, energy facilities, the like, or any combination thereof.

The natural resource extraction facilities may include oil rigs, oil wells, natural gas wells, mines, the like, or any combination thereof.

The energy facilities may include hydroelectric power plants, thermal power plants, solar power plants, wind power plants, the like, or any combination thereof.

The resource supply infrastructure may include power lines, power line towers, power line poles, oil pipelines, natural gas pipelines, cellular network towers, dams, the like, or any combination thereof. The transportation infrastructure may include roads, bridges, railways, transportation hubs (e.g., train stations and airports), the like, or any combination thereof.

The one or more three-dimensional objects may be at various stages of assembly. For example, the one or more three-dimensional objects may be a manufacturing factory that is under construction or a finished construction.

One or more three-dimensional objects may abut and/or be connected to one or more other three-dimensional objects, forming one or more interfaces. The one or more three-dimensional objects may be at least partially framed by one or more surrounding spaces. The one or more surrounding spaces may be proximal to the one or more three-dimensional objects.

The one or more three-dimensional objects may comprise one or more surfaces. The one or more surfaces may include any surface that is located on an exterior or interior of the one or more three-dimensional objects. The one or more surfaces may be observable from one or more surrounding spaces of the one or more three-dimensional objects.

The one or more three-dimensional objects may comprise one or more three-dimensional subcomponents, an identity, one or more properties, one or more operating conditions, or any combination thereof.

The one or more three-dimensional objects may comprise one or more three-dimensional subcomponents ("subcomponents"). The one or more three-dimensional subcomponents may include the constituent parts of the one or more three-dimensional objects. For example, a vehicle may include a chassis, body, engine, transmission, electrical system, and exhaust system, each of which are three-dimensional subcomponents of the vehicle. The one or more three-dimensional objects may provide and/or enable a particular function for the operation, structural integrity, or both of the one or more three-dimensional objects.

One or more three-dimensional subcomponents may abut and/or be connected to one or more other three-dimensional subcomponents, forming one or more interfaces. One or more three-dimensional subcomponents may abut and/or be connected to one or more three-dimensional objects, forming one or more interfaces. The one or more three-dimensional subcomponents may be at least partially framed by one or more surrounding spaces. The one or more surrounding spaces may be proximal to the one or more three-dimensional subcomponents.

The one or more three-dimensional subcomponents may comprise one or more surfaces. The one or more surfaces may include any surface that is located on an exterior or interior of the one or more three-dimensional subcomponents. The one or more surfaces may be observable from one or more surrounding spaces of the one or more three-dimensional subcomponents.

The one or more three-dimensional subcomponents may include one or more other three-dimensional subcomponents. It may be appreciated by a skilled artisan that objects and subcomponents thereof may be broken down into various degrees of hierarchy. For example, a CNC machine (object) may include an electrical system (subcomponent), and the electrical system may include a controller (subcomponent of the subcomponent). The one or more three-dimensional subcomponents may comprise an identity, one or more properties, one or more operating conditions, or any combination thereof.

The one or more three-dimensional objects may be located within one or more spaces. The one or more spaces may include one or more subdivisions of a structure, delineations of property, or both. For example, a subdivision of a structure may include a factory floor of a manufacturing factory in which a plurality of machinery (objects) are located. As another example, a delineation of property may include a plot of land on which a plurality of oil wells (objects) are located.

The one or more spaces may be defined by a length, a width, a height, one or more angles, or any combination thereof.

The one or more spaces may include an open space, an enclosed space, or both. For example, an open space may include an oil field. As another example, an enclosed space may include an interior of a manufacturing factory.

The one or more spaces may include one or more three-dimensional objects. One or more three-dimensional objects may be distributed throughout the one or more spaces. The one or more three-dimensional objects may be statically situated within the one or more spaces. For example, heavy machinery may be situated within and even fastened to a floor of a space. The one or more three-dimensional objects may be movable within the one or more spaces. For example, a forklift may be movable within a space. The one or more three-dimensional objects may occupy a volume of the one or more spaces. A position of the one or more three-dimensional objects within the one or more spaces may change from time to time. For example, one may change the positions of industrial equipment in manufacturing factories to improve efficiency of an assembly line or to reconfigure an assembly line for a new product. One or more three-dimensional objects may be added and/or removed from the one or more spaces from time to time. For example, new industrial equipment may be added to the factory floor of a manufacturing factory.

The one or more three-dimensional objects, three-dimensional subcomponents thereof, or both may be characterized by an identity. The identity may include a common name of the objects and/or subcomponents. The common name may include a name that is attributed to all objects and/or subcomponents of their respective type, regardless of make, model, or the like. For example, the common name, "CNC machine", may encompass a large number of commercially available machinery. The identity may include a manufacturer and/or seller of the objects and/or subcomponents. The identity may include a make, model, year in which the objects and/or subcomponents were manufactured, the like, or any combination thereof. The identity may include a unit number. The unit number may be arbitrarily designated. The unit number may be particularly advantageous in distinguishing between a plurality of identical objects and/or subcomponents. For example, three identical CNC machines may be designated "CNC 1", "CNC 2", and "CNC 3". The identity may include a nickname. The nickname may be arbitrarily designated. The identity may be extrapolated from the plurality of attributes. For example, by comparing a three-dimensional model constructed from a scan of an object and comparing the same to a catalogue of CAD models, one may determine the identity of the object.

The identity of a three-dimensional object and/or subcomponent may be associated with data of one or more attributes. The identity may be associated with a visual signature, thermal signature, acoustic signature, vibration signature, chemical signature, or any combination thereof.

The one or more three-dimensional objects, three-dimensional subcomponents thereof, or both may comprise a plurality of attributes. The plurality of attributes may function to characterize the physical conformation and/or condition of the objects and/or subcomponents.

The plurality of attributes may include any measurable quality associated with the objects and/or subcomponents. The plurality of attributes may be measurable as a quantity. The plurality of attributes may include one or more points in physical space, color, illuminance, thermal signature, acoustic signature, vibration signature, chemical signature, or any combination thereof. Points in physical space, color, illuminance, or any combination thereof may be referred to herein, singularly or in any combination, as a visual signature.

The one or more points in physical space ("point cloud") may be defined by coordinates in two-dimensional space (X, Y), coordinates in three-dimensional space (X, Y, Z), or both. The one or more points in physical space may be defined by one or more reference points ("zero point"). The one or more reference points may be arbitrarily designated. The one or more reference points may be designated to coincide with a landmark or a point of interest. For example, a reference point may be located at an approximately geometrical center point of a space. The one or more points in physical space may characterize a position of the one or more three-dimensional objects, three-dimensional subcomponents thereof, or both within a space. The one or more points in physical space may characterize a volume of a space occupied by the objects and/or subcomponents.

One or more points in physical space may be obtained by one or more sensors. The sensors may include global positioning system (GPS) sensors, camera sensors, LiDAR sensors, laser interferometer sensors, or any combination thereof. Since these sensors determine the points in physical space occupied by a three-dimensional object and/or subcomponents thereof, the relative positions of other sensors (e.g., thermal sensors) to these sensors may be accounted for to accurately attribute a location to the data of the other sensors. For example, a temperature of a point on a three-dimensional object may be attributed to a location determined by a LiDAR sensor offset by a position of the LiDAR sensor relative to the thermal sensor.

Color may be defined by greyscale, a color space, or both. The greyscale may include a pixel value scale of 0-255. The color space may include an RGB color space, IHS color space, the like, or any combination thereof. The color of the one or more three-dimensional objects, three-dimensional subcomponents thereof, or both may be natural or artificial. Natural color may refer to the color of materials in their natural state. For example, iron is typically silver-grey. Artificial color may refer to the color of paint, coatings, pigments, the like, or any combination thereof that are applied onto or integrated within the one or more three-dimensional objects, three-dimensional subcomponents thereof, or both.

Illuminance may be defined by a quantity of incident light that illuminates one or more surfaces of the one or more three-dimensional objects, three-dimensional subcomponents thereof, or both. The illuminance may characterize illuminated portions and shaded portions on the objects and/or subcomponents. The illuminance may change during the course of a day. The illuminance may result from natural light (e.g., sunlight), artificial light, intervening objects casting a shadow, or any combination thereof. The illuminance may result from direct light or reflected light. The thermal signature may be defined by temperature, heat flux, or both.

The thermal signature may result from heating elements (e.g., resistive heating wires) in the objects and/or subcomponents; electromagnetic activity of the objects and/or subcomponents; chemical processes (exothermic and/or endothermic) occurring within objects and/or subcomponents; frictional forces generated by the objects and/or subcomponents; radiant heat, originating from external sources, incident on the objects and/or subcomponents; ambient temperature surrounding the objects and/or subcomponents; the like; or any combination thereof.

The acoustic signature may be defined by sound amplitude, frequency, or both.

The acoustic signature may result from electromagnetic activity of the objects and/or subcomponents; chemical processes occurring within the objects and/or subcomponents; frictional forces generated by the objects and/or subcomponents; mechanical operation of the objects and/or subcomponents; fluid flow; sound originating from other objects and/or subcomponents reverberating off of the objects and/or subcomponents; the like; or any combination thereof.

The vibration signature may be defined by movement or oscillation of the objects and/or subcomponents about an equilibrium position. The vibration signature may result from electromagnetic activity of the objects and/or subcomponents; chemical processes occurring within the objects and/or subcomponents; frictional forces generated by the objects and/or subcomponents; mechanical operation of the objects and/or subcomponents; forces translated, by one or more external sources, to the objects and/or subcomponents; fluid flow; the like; or any combination thereof.

The chemical signature may be defined by the presence, quantity, identity, or any combination thereof of any chemical. The chemical may be used by the objects and/or subcomponents during their operation. For example, a cooler may utilize refrigerant during its operation. The chemical may be foreign to the objects and/or subcomponents. For example, a solvent may be spilled next to an object, but the solvent may not be used by the object for its operation.

The plurality of attributes may change from time to time. For example, an industrial oven may be operational at a first time resulting in a first thermal signature, and at a second time the industrial oven may not be operational resulting in a second thermal signature that is distinguishable from the first thermal signature. The plurality of attributes may be observable from one or more surfaces of the objects and/or subcomponents. The plurality of attributes may be integral to one or more surfaces of the objects and/or subcomponents. For example, points in physical space and color are integral to one or more surfaces. The plurality of attributes may be projected onto one or more surfaces of the objects and/or subcomponents. For example, a thermal signature may originate from an interior of an object and by radiant and/or conductive heating, the thermal signature may be projected onto one or more surfaces.

Quantitative measurements of the plurality of attributes may be each associated with one or more points in physical space of the objects and/or subcomponents. For example, each data point of a thermal signature may be associated with an X, Y, and Z coordinate in physical space.

Data points from different types of attributes may be associated with the same point in physical space. In this manner, three-dimensional models of the objects and/or subcomponents may be constructed. The three-dimensional models may provide a visualization of one or simultaneously any combination of the plurality of attributes.

The one or more three-dimensional objects, three-dimensional subcomponents thereof, or both may comprise one or more properties. The one or more properties may be characterized by qualitative descriptions of the objects and/or subcomponents. The one or more physical properties may be extrapolated from the plurality of attributes.

The one or more properties may include physical conformations of the objects and/or subcomponents. The physical conformation may include the presence, absence, and/or position of a three-dimensional object or subcomponents thereof. For example, an object may have a door having an open conformation and closed conformation. As another example, a subcomponent of an object may have broken away from the object and such condition may be qualitatively described as "missing subcomponent".

The one or more properties may include physical conditions of the objects and/or subcomponents. For example, an oven normally operates at a specific temperature, which can be qualitatively described as "normal temperature". The physical condition may include a condition of a material. For instance, a material may be corroded, worn, abraded, the like, or any combination thereof.

The one or more properties may include one or more operating conditions. The operating conditions may include any physical conformation and/or condition of the objects and/or subcomponents when they are operational. The operating condition may include a value or range of temperature, pressure, vibration, the like, or any combination thereof.

The one or more properties may include a stagnant condition. The stagnant condition may include any physical conformation and/or condition of the objects and/or subcomponents when they are non-operational.

The one or more properties may be described by qualitative verbal descriptors. The qualitative verbal descriptors may include binary descriptors, scaled descriptors, or both. The binary descriptor may differentiate between two distinct physical conformations and/or conditions. For example, the binary classification of a position of a door can be "open" or "closed". The scaled descriptors may differentiate between three or more distinct physical conformations and/or conditions. For example, an oven may be "cool", "hot", or "overheated".

The one or more properties may be extrapolated from the plurality of attributes. Two or more attributes may be associated with the same property. For example, one or more points in physical space and a thermal signature may both indicate a position of a door. Two or more attributes may be compared to confirm one or more properties associated with the one or more attributes when considered individually. The one or more properties may be manually associated with the plurality of attributes, by a user. For example, a user may access a three-dimensional model of an object, displaying a thermal signature, and manually designate the thermal signature with one or more properties. In this manner, a historical database of three-dimensional models of objects and/or subcomponents may be created, and any future three-dimensional working model may be autonomously compared to one or more three-dimensional models in the historical database and one or more properties may be autonomously attributed to the future three-dimensional working models. The one or more properties may be autonomously associated with the plurality of attributes. A neural network may be utilized by the system of the present disclosure to autonomously identify one or more three-dimensional objects and/or subcomponents thereof. A neural network may be utilized by the system of the present disclosure to autonomously determine one or more properties of the objects and/or subcomponents based upon a plurality of attributes.

System and Hardware

The present disclosure provides for a data collection and processing system. The data collection and processing system may function to collect data, receive data, transmit data, perform operations with data, or any combination thereof. The data may be associated with a plurality of attributes of one or more three-dimensional objects, three-dimensional subcomponents thereof, or both.

The data collection and processing system may be located within a space. The data collection and processing system may be located remote from a space, at least in part. The data collection and processing system may be movable within the space. The data collection and processing system may remain in a space. The data collection and processing system may be movable between spaces.

Individual elements of the data collection and processing system may be connected via a wired connection, wireless connection, or both. Individual elements of the data collection and processing system may be connected via a network. The data collected by the data collection and processing system may be stored locally, remotely, or both. As referred to herein, "local" may refer to hardware that is located physically on or within a particular element (e.g., a hard drive in a computer) and "remote" may refer to hardware that is located physically apart from a particular element (e.g., cloud storage).

The data collection and processing system may comprise one or more sensor apparatuses, docking stations, computing devices, application servers, database servers, diagnostic devices, or any combination thereof.

The data collection and processing system may comprise one or more sensor apparatuses. The one or more sensor apparatuses may function to collect data, receive data, transmit data, perform operations with data, or any combination thereof.

The one or more sensor apparatuses may include a roving device, stationary device, or both. The roving device may be movable within a space. The roving device may comprise on-board transportation componentry. The stationary device may be free of transportation componentry. The transportation componentry may include wheels, tracks, propellers, rotors, wings, the like, or any combination thereof. The roving device may be autonomously piloted, manually piloted, or both. The roving device may include an airmobile drone, a ground-mobile robot, the like, or any combination thereof. Operation of a roving device may be referred to as a roving operation.

The stationary device may be attached to a static structure. The static structure may include a frame for providing structural support, building structure, three-dimensional object, the like, or any combination thereof. The frame may be freestanding; or coupled to a building structure, three-dimensional object, or both. The stationary device may be movable on the static structure. The static structure may include one or more tracks on which the stationary device is movable. The stationary device may include a stationary location, a stationary orientation, a dynamic location, a dynamic orientation, or any combination thereof while attached to the static structure. Orientation may refer to a direction in which the stationary device and/or sensors located thereon are facing. The dynamic location may refer to any location confined to a static structure.

Operation of a stationary device having a stationary location while sensed objects and/or subcomponents move relative to the stationary device may be referred to as a stationary operation. Operation of a stationary device having a dynamic location while sensed objects and/or subcomponents move relative to the stationary device may be referred to as a mutually relative motion operation.

The one or more sensor apparatuses may comprise one or more sensors, processors, storage media, batteries, power ports, data ports, network modules, location modules, user interfaces, or any combination thereof.

Data may be acquired by a plurality of sensors at different times. Data may be acquired by a plurality of sensors on-board one or more types of sensor apparatuses. For example, data of a three-dimensional object may be obtained at a first time by a plurality of sensors on-board a robot and data of the same three-dimensional object may be obtained at a second time by a plurality of sensors on-board a drone.

The one or more sensors, processors, storage media, batteries, power ports, data ports, network modules, location modules, user interfaces, or any combination thereof may be located within and/or coupled to the same housing. The housing may protect elements of the sensor apparatus from environmental conditions. The housing may be waterproof or at least water resistant. The housing may be waterproof when submerged underwater at a depth of about 10 m or more or even 20 m or more. The housing may be waterproof when submerged underwater at a depth of about 60 m or less or even 50 m or less.

The one or more sensor apparatuses may traverse one or more paths. The one or more paths may be defined in two-dimensional space, three-dimensional space, or both. The one or more paths may at least partially surround one or more three-dimensional objects. The one or more paths may be located above one or more three-dimensional objects, level with one or more three-dimensional objects, below one or more three-dimensional objects, or any combination thereof.

The one or more paths may extend along one or more planes. The planes may be vertical, horizontal, at an angle, or any combination thereof. The angle may be about 5° or more, 10° or more, 30° or more, 50° or more, or even 70° or more. The angle may be about 175° or less, 160° or less, 140° or less, 120° or less, or even 100° or less. The one or more paths may meander through one or more planes. The one or more paths may extend in one or more straight segments through one or more planes. The one or more straight segments may be oriented at an angle with respect to one another. The angle may be about 5° or more, 10° or more, 20° or more, 30° or more, or even 40° or more. The angle may be about 85° or less, 80° or less, 70° or less, 60° or less, or even 50° or less.

The one or more paths may be curved. The curve may be defined by a circle, ellipse, parabola, segments thereof, the like, or any combination thereof. The one or more paths may rise and/or fall with respect to the ground. The one or more paths may rise and/or fall in a stepwise manner, a wave-like manner, a zigzag manner, or any combination thereof. The one or more paths may intersect with itself at one or more intersections.

The one or more paths may include a start point, end point, or both. The one or more paths may start, end, or both at one or more docking stations. The starting point may be the same as or different from the end point. The one or more paths may comprise a plurality of different positions along the course of the path. The plurality of positions may be located a distance from one or more three-dimensional objects, one or more subcomponents thereof, or both. The distance may be about 1 meter or more, 5 meters or more, 10 meters or more, 15 meters or more, 20 meters or more, or even 25 meters or more. The distance may be about 50 meters or less, 45 meters or less, 40 meters or less, 35 meters or less, or even 30 meters or less.

The one or more paths may be predetermined. The one or more paths may be adjusted while one or more sensor apparatuses traverse the one or more paths. The adjustments may be determined by a user, autonomously by one or more sensor apparatuses, or both. For example, a sensor apparatus may detect an obstacle in the path and adjust the path to avoid the obstacle.

The one or more sensor apparatuses may retrace one or more paths. The same path may be traversed during subsequent instances of data collection. The paths may be different for subsequent instances of data collection. The paths of different instances of data collection may not obscure the identities of the one or more three-dimensional objects. Whereas prior methods by some require data collection, at different instances, along the same path in order to properly identify one or more three-dimensional objects, the present disclosure provides for an improved method whereby one or more three-dimensional objects may be identified without requiring the same path to be traversed. This feature may be attributed, at least in part, by the collocation of sensed three-dimensional data and the comparison and/or overlaying of one or more three-dimensional models.

The one or more sensor apparatuses may comprise one or more sensors. The one or more sensors may include a plurality of sensors. The plurality of sensors may include different sensors. The one or more sensors may include one or more camera sensors, LiDAR sensors, laser interferometer sensors, thermal sensors, acoustic sensors, chemical sensors, the like, or any combination thereof. The one or more sensors may include one or more manufactured electronic devices or other hardware devices. The one or more sensors may interact with the physical environment and converts its interaction with the physical environment to electrical signals.

The one or more camera sensors may include one or more charge-coupled devices (CCD), active-pixel sensors (CMOS), or both. Photons may pass through one or more lenses and interact with the one or more camera sensors. The one or more camera sensors may convert its interaction with photons into electrical signals.

The one or more LiDAR sensors may include topographic LiDAR sensors, bathymetric LiDAR sensors, or both. The one or more LiDAR sensors may include a laser array, a photodetector, or both. The laser array may emit photons, the photons may reflect from a surface of an object, and the reflected photons may interact with the photodetector. The photodetector may convert its interaction with photons into electrical signals. Topographic LiDAR sensors may utilize near-infrared light in a wavelength range of from about 800 nm to about 2500 nm. Bathymetric LiDAR sensors may utilize a wavelength of about 100 nm to 1000 nm (e.g., green light at about 532 nm).

The one or more thermal sensors may include a pyrometer, thermometer, or both. The one or more thermal sensors may include an infrared sensor. Infrared radiation may pass through one or more lenses and/or interact with the infrared sensor. The infrared sensor may convert its interaction with infrared radiation into electrical signals.

The one or more acoustic sensors may include one or more microphones. The microphone may include a diaphragm. The diaphragm may interact with air molecules having sound waves propagating therethrough. The sound waves may cause the diaphragm to vibrate. The vibration may be converted to electrical signals.

The one or more chemical sensors may include a chemical sniffer, laser spectrometry sensor, tunable diode laser sensors, optical gas imaging cameras, or both. The chemical sniffer may utilize ultra-fast gas chromatography technology, acoustic wave technology, or both.

The plurality of sensors may capture data associated with a plurality of attributes of one or more three-dimensional objects, subcomponents thereof, or both. The one or more camera sensors may capture data associated with one or more points in physical space, color, illuminance, or both. The one or more LiDAR sensors may capture data associated with one or more points in physical space, a vibration signature, or both. The one or more laser interferometry sensors may capture data associated with one or more points in physical space, a vibration signature, or both. The one or more thermal sensors may capture data associated with a thermal signature. The one or more acoustic sensors may capture data associated with an acoustic signature. The one or more chemical sensors may capture data associated with a chemical signature.

The data collected by the plurality of sensors may be processed into derivative data. The derivative data may include a sub-section of the captured data. For example, an acoustic signature may include data at several different frequencies and derivative data may include a dominant frequency, decomposition of several frequencies based upon frequency bands, or decomposition of data based upon incident angle with a surface of a three-dimensional object. The derivative data may include a combination of the captured data. The derivative data may include an output of one or more calculations performed on the captured data. The one or more sensors may have a positional variance from one or more other sensors. The positional variance may be defined by a distance between two or more sensors. The positional variance may be corrected for, so the positional variance is not reflected in collocated data, resulting in inaccurate and/or distorted models.

The data collection and processing system may comprise one or more docking stations. The one or more docking stations may function to receive data, transmit data, perform operations with data, charge one or more sensor apparatuses, or any combination thereof. The one or more sensor apparatuses may be located at one or more docking stations when the one or more sensor apparatuses are not operational. The one or more docking stations may charge one or more sensor apparatuses via a wired connection, a wireless connection (e.g., inductive charging), or both. The one or more docking stations may be a starting point of a path, an end point of a path, or both.

The one or more docking stations may receive data from the one or more sensor apparatuses via a wired connection, wireless connection, or both. The one or more docking stations may communicate with one or more sensor apparatuses via a network. The one or more docking stations may transmit data via a wired connection, a wireless connection, or both. The one or more docking stations may communicate with one or more computing devices, database servers, application servers, diagnostic devices, or any combination thereof via a network. The one or more docking stations may transmit data to one or more sensor apparatuses, computing devices, database servers, application servers, diagnostic devices, or any combination thereof.

The one or more docking stations may comprise one or more processors, storage media, batteries, power ports, data ports, network modules, location modules, user interfaces, or any combination thereof.

The data collection and processing system may comprise one or more computing devices. The one or more computing devices may function to receive and/or transmit data, perform operations with data, store data, retrieve data, execute one or more computer-executable instructions, or any combination thereof. The one or more computing devices may include one or more personal computers, mobile devices, or both. The one or more personal computers may include a laptop computer, desktop computer, or both. The one or more mobile devices may include a tablet, mobile phone, smart watch, the like, or any combination thereof.

The one or more computing devices may include or communicate with one or more other computing devices, processors, storage media, databases, user interfaces, or any combination thereof. The one or more computing devices may communicate via a wired connection, wireless connection, or both. The one or more processors, storage media, databases, user interfaces, or any combination thereof may be local to and/or remote from the one or more computing devices. The one or more computing devices may communicate with one or more other computing devices, sensor apparatuses, docking stations, database servers, application servers, diagnostic devices, or any combination thereof via an interaction interface. The interaction interface may include an application programming interface ("API").

The one or more computing devices may include one or more processors, storage media, batteries, power ports, data ports, network modules, location modules, user interfaces, or any combination thereof.

The data collection and processing system may comprise one or more database servers. The one or more database servers may function to receive, store, or transmit data, or any combination thereof.

The one or more database servers may receive data from and/or transmit data to one or more sensor apparatuses, docking stations, computing devices, application servers, diagnostic devices, or any combination thereof. The one or more database servers may communicate via a wired connection, wireless connection, or both.

The one or more database servers may store data in a database. The one or more database servers may store one or more catalogs of one or more pre-fabricated three-dimensional models. The one or more database servers may store a historical database of one or more three-dimensional models.

The one or more database servers may include one or more cloud-based servers. The one or more application servers may be accessible via a web-based application. As referred to herein, web-based application may refer to an application that is accessible via an internet browser and associated with computer-readable instructions that are not entirely stored and/or executed by hardware of a client's computing device.

The one or more database servers may also be referred to as one or more application servers if the one or more database servers also performs operations on data via computer-readable instructions stored on one or more non-transitory computer storage media and carried out by one or more processors, according to the method of the present disclosure (i.e., dual-purpose server).

The one or more database servers may comprise one or more processors, storage media, power ports, data ports, network modules, user interfaces, or any combination thereof.

The data collection and processing system may comprise one or more application servers. The one or more application servers may function to receive data, perform operations with data, transmit data, or any combination thereof.

The one or more application servers may receive data from one or more sensor apparatuses, docking stations, computing devices, database servers, diagnostic devices, or any combination thereof. The one or more application servers may communicate via a wired connection, wireless connection, or both. The one or more application servers may perform operations on data via computer-readable instructions stored on one or more non-transitory computer storage media and carried out by one or more processors, according to the method of the present disclosure.

The one or more application servers may include one or more cloud-based servers. The one or more application servers may be accessible via a web-based application.

The one or more application servers may also be referred to one or more database servers if the one or more application servers store data (i.e., dual-purpose server).

The one or more application servers may comprise one or more processors, storage media, power ports, data ports, network modules, user interfaces, or any combination thereof.

The one or more sensor apparatuses, docking stations, computing devices, database servers, application servers, diagnostic devices, or any combination thereof may comprise one or more processors. The one or more processors may function to retrieve data, receive data, perform one or more operations with data, transmit data, or any combination thereof.

The one or more operations may include executing one or more computer-readable instructions, executing one or more algorithms, applying one or more rules, or any combination thereof. The processor may retrieve and/or receive one or more computer-readable instructions, one or more algorithms, one or more rules, or any combination thereof from one or more storage media. The processor may retrieve and/or receive data from one or more storage media (input), perform operations with the data (processing), and transmit processed data to one or more storage media (output).

The one or more processors may include one or more central processing units ("CPU"), graphics processing units ("GPU"), field-programmable gate arrays ("FPGA"), or any combination thereof. An example of a suitable CPU may include the Intel® Core™ i9-10900K, incorporated herein by reference in its entirety for all purposes. An example of a suitable GPU may include the NVIDIA GeForce RTX™ 3090, incorporated herein by reference in its entirety for all purposes.

The one or more processors may be local to one or more sensor apparatuses, docking stations, computing devices, database servers, application servers, diagnostic devices, or any combination thereof. The one or more processors may be remote from one or more sensor apparatuses, docking stations, computing devices, database servers, application servers, diagnostic devices, or any combination thereof. The one or more processors may communicate with one or more other processors, storage media, network modules, data ports, or any combination thereof.

The one or more processors may include one or more cloud-based processors. The one or more cloud-based processors may be located remote from one or more sensing apparatuses, docking stations, computing devices, diagnostic devices, or any combination thereof. The one or more cloud-based processors may be included in one or more application servers, database servers, or both. One or more cloud-based processors may be accessible via one or more networks. An example of a suitable cloud-based processor may include the Amazon Elastic Compute Cloud™ (EC2™) provided by Amazon Web Services®, incorporated herein by reference in its entirety for all purposes. Another example of a suitable cloud-based processor may include Lambda™ provided by Amazon Web Services®, incorporated herein by reference in its entirety for all purposes.

The one or more sensor apparatuses, docking stations, computing devices, database servers, application servers, diagnostic devices, or any combination thereof may comprise one or more storage media. The one or more storage media may include non-transitory storage media. The one or more storage media may function to store one or more applications, data, databases, computer-executable instructions, algorithms, rules, the like, or any combination thereof.

The data stored within the one or more storage media may be compressed, encrypted, or both. The one or more storage media may store data in a native format, foreign format, or both. The one or more storage media may store data as one or more databases. The one or more storage media may store data as objects, files, blocks, or any combination thereof. The one or more storage media may receive and/or store data provided from a plurality of sensors.

The one or more storage media may cooperate with one or more processors for accessing, executing, and/or storing one or more applications, data, databases, algorithms, rules, computer-executable instructions, the like, or any combination thereof.

The one or more storage media may include one or more hard drives, chips, discs, flash drives, memory cards, the like, or any combination thereof. The one or more hard drives may include a solid state disk ("SSD"), hard drive disk ("HDD"), the like, or any combination thereof. The one or more chips may hold memory temporarily via random access memory ("RAM"), permanently via read only memory ("ROM"), or both. The one or more chips may include dynamic random access memory ("DRAM") chips, static random access memory ("SRAM") chips, first in first out ("FIFO") chips, erasable programmable read only memory ("EPROM"), programmable read only memory ("PROM"), the like, or any combination thereof. The one or more discs may include one or more floppy diskettes, hard disk drives, optical data storage media (e.g., CD ROMs, DVDs), the like, or any combination thereof.

The one or more storage media may be local to one or more sensor apparatuses, docking stations, computing devices, database servers, application servers, diagnostic devices, or any combination thereof. The one or more storage media may be remote from one or more sensor apparatuses, docking stations, computing devices, database servers, application servers, diagnostic devices, or any combination thereof.

The one or more storage media may include one or more cloud-based storage media. The cloud-based storage media may be located remote from one or more sensing apparatuses, docking stations, computing devices, or any combination thereof. The cloud-based storage media may be included in one or more database servers, application servers, or both. One or more cloud-based storage media may be accessible via one or more networks. An example of a suitable cloud-based storage media may include Amazon S3™ provided by Amazon Web Services®, incorporated herein by reference in its entirety for all purposes.

The one or more storage media may include one or more databases. The one or more databases may function to receive data, organize data, provide for retrieval of data, or any combination thereof. The one or more databases may be stored on one or more storage media. The one or more databases may be accessible by one or more processors to retrieve data for performing one or more operations with the data. Processed data may be provided to one or more databases by one or more processors for storage.

The one or more databases may include any type of database suitable for storing data. The data may be stored within one or more databases in any suitable storage form using any suitable database management system ("DBMS"). Exemplary storage forms may include relational databases, non-relational databases, correlation databases, ordered/unordered flat files, structured files, the like, or any combination thereof. The relational databases may include SQL database, row-oriented, column-oriented, the like, or any combination thereof. The non-relational databases may include NoSQL database.

The one or more databases may store one or more classifications of data models. The one or more classifications may include column (e.g., wide column), document, key-value (e.g., key-value cache, key-value store), object, graph, multi-model, the like, or any combination thereof.

The one or more databases may be stored on one or more storage media local to one or more sensor apparatuses, docking stations, computing devices, database servers, application servers, or any combination thereof. The one or more databases may be remote from one or more sensor apparatuses, docking stations, computing devices, database servers, application servers, diagnostic devices, or any combination thereof. The one or more databases may include one or more cloud-based databases. The one or more cloud-based databases may be included in one or more database servers, one or more application servers, or both. The cloud-based databases may be located remote from one or more sensing apparatuses, docking stations, computing devices, diagnostic devices, or any combination thereof. The one or more cloud-based databases may be accessible via one or more networks. An example of a suitable cloud-based database may include Amazon DynamoDB® offered through Amazon Web Services®, incorporated herein by reference in its entirety for all purposes.

The one or more sensor apparatuses, docking stations, computing devices, database servers, application servers, diagnostic devices, or any combination thereof may comprise one or more batteries. The one or more batteries may function to provide power to one or more sensor apparatuses, the docking stations, diagnostic devices, elements thereof, or any combination thereof. The one or more batteries may include rechargeable batteries, single-use batteries, or both. The one or more batteries may include one or more alkaline batteries, lithium-ion batteries, nickel-metal hydride batteries, the like, or any combination thereof. The one or more batteries may be connected to one or more sensors, processors, storage media, location modules, network modules, or any combination thereof.

The one or more sensor apparatuses, docking stations, computing devices, database servers, application servers, diagnostic devices, or any combination thereof may comprise one or more power ports. The one or more power ports may function to provide power to one or more sensor apparatuses, docking stations, batteries, or any combination thereof. One or more batteries may be chargeable via one or more power ports. The one or more power ports may include one or more universal serial bus ("USB") ports, DC ports, the like, or any combination thereof.

The one or more sensor apparatuses, docking stations, computing devices, database servers, application servers, diagnostic devices, or any combination thereof may comprise one or more data ports. The one or more data ports may function to transmit and/or receive data. The one or more data ports may include one or more universal serial bus ("USB") ports, thunderbolt ports, firewire ports, the like, or any combination thereof. The one or more data ports may communicate with one or more storage media, processors, or both. The one or more data ports may provide communication between one or more sensor apparatuses, docking stations, computing devices, diagnostic devices, or any combination thereof. The one or more data ports may communicate with one or more other data ports via a wired connection.

The one or more sensor apparatuses, docking stations, computing devices, database servers, application servers, diagnostic devices, or any combination thereof may comprise one or more location modules. The one or more location modules may function to send and/or receive location information to and/or from a global positioning system ("GPS") satellite. The one or more location modules may include a global navigation satellite system ("GNSS") module. The location information may be defined by latitude, longitude, altitude, or any combination thereof. Relating the latitude, longitude, altitude, or any combination thereof, of one location to another location may denote movement information (e.g., distance, speed, or both).

The one or more sensor apparatuses, docking stations, computing devices, database servers, application servers, diagnostic devices, or any combination thereof may comprise one or more network modules. The one or more network modules may receive data from and/or transmit data to one or more devices, integrate one or more devices into a network, or both. As referred to herein, "device" as used apart from a modifier (e.g., "computing" device) may refer to one or more sensor apparatuses, docking stations, computing devices, database servers, application servers, diagnostic devices, or any combination thereof. One or more network modules may communicate with one or more other network modules via one or more networks. The one or more network modules may provide communication between one or more sensor apparatuses, docking stations, computing devices, database servers, application servers, diagnostic devices, or any combination thereof via one or more networks.

The one or more network modules may include one or more wired network modules, one or more wireless network modules, or both. A wired network module may be any module capable of transmitting and/or receiving data via a wired connection. The wired network module may communicate with one or more networks via a direct, wired connection. The wired network module may include a network interface controller, PC Card, PCMCIA card, PCI card, the like, or any combination thereof. The wired connection may include an ethernet port. The wireless network module may include any module capable of transmitting and/or receiving data via a wireless connection. The one or more wireless network modules may communicate with one or more networks via a wireless connection. The one or more wireless network modules may include a cellular transceiver, Wi-Fi transceiver, Bluetooth® transceiver, infrared transceiver, radio frequency transceiver, near-field communication ("NFC") module, the like, or any combination thereof.

The one or more sensor apparatuses, docking stations, computing devices, database servers, application servers, diagnostic devices, or any combination thereof may communicate with each other via one or more networks. The one or more networks may function to transmit data between one or more sensor apparatuses, docking stations, computing devices, database servers, application servers, or any combination thereof.

The one or more networks may be formed by placing two or more devices in communication with one another. The one or more networks may be temporarily connected to one or more devices, permanently connected to one or more devices, or both. The one or more devices may be in selective communication with the one or more networks. The one or more networks may allow for one or more devices to be connected to one or more other devices to transmit data, receive data, or both. The one or more networks may allow for one or more devices to transmit data, receive data, or both to and/or from one or more storage media. The one or more networks may allow for transmission of data for processing by one or more processors. The one or more networks may be connected to one or more other networks.

The one or more networks may include one or more local area networks ("LAN"), wide area networks ("WAN"), virtual private network ("VPN"), personal area networks ("PAN"), cellular networks, Bluetooth® networks, intranet, internet, the like, or any combination thereof. The one or more networks may include a wireless network, a wired network, or both.

The one or more sensor apparatuses, docking stations, computing devices, database servers, application servers, diagnostic devices, or any combination thereof may include one or more user interfaces. The one or more user interfaces may function to display data in a visual format, receive user inputs, transmit data associated with the user inputs, or any combination thereof.

The one or more user interfaces may include one or more cameras, graphical user interfaces ("GUI"), microphones, speakers, keyboards (e.g., physical keyboard, digital keyboard, or both), mice, the like, or any combination thereof. The one or more user interface may be located on a device (e.g., a mobile phone screen), remote from a device (e.g., a monitor separate from a computer), or both. The graphical user interface may be included on a headset (e.g., virtual reality headset).

User interfaces that receive user inputs may be referred to as input devices. The one or more user input devices may function to receive one or more user inputs from a user, convert one or more user inputs into one or more signals, or both. The one or more input devices may include one or more buttons, wheels, keyboards, switches, mice, joysticks, touch pads, touch-sensitive screens, microphones, the like, or any combination thereof.

The touch pad may include a touch-sensitive area, provided as a separate peripheral or integrated into a computing device, that does not display visual output. The one or more touch-sensitive screens may function to accept one or more user inputs from a user based on tactile contact. The one or more touch-sensitive screens may include a screen, a display controller, or both. The one or more touch-sensitive screens may detect contact and convert the detected contact into interaction with one or more interface objects (e.g., buttons, icons, web pages, images, menus, the like, or any combination thereof) that are displayed on the touch-sensitive screen. The one or more touch-sensitive screens may detect contact via touch sensing technology. The touch sensing technology may include capacitive, resistive, infrared, surface acoustic wave technologies, or any combination thereof. The one or more touch-sensitive screens may detect contact from an appendage (e.g., finger), an object (e.g., a stylus), or both.

The one or more user interfaces may include one or more graphical user interfaces ("GUI"). The one or more graphical user interfaces may include one or more screens. The one or more screens may be located on a device, remote from a device, or both. An example of a screen located on a device may include a mobile phone screen. An example of a screen located remote from a device may include an external monitor for a desktop computer.

The one or more screens may utilize liquid crystal display ("LCD") technology, light emitting polymer display ("LPD") technology, light emitting diode ("LED") technology, organic light emitting diode (OLED) technology, the like, or any combination thereof.

The graphical user interface may display a visual reproduction of one or more three-dimensional models. The graphical user interface may allow a user to manipulate and/or interact with a visual reproduction of one or more three-dimensional models.

The one or more graphical user interfaces may be in communication with one or more user input devices. The one or more input devices may be integrated with one or more graphical user interfaces. The one or more input devices may include one or more touch-sensitive screens.

The one or more graphical user interfaces may display one or more interface metaphors (i.e., "interface objects"). The interface metaphor may function to give the user instantaneous knowledge about how to interact with the user interface. The interface metaphor may include visuals, actions, and procedures that exploit specific knowledge that users may already possess from other domains of life. An example of an interface metaphor may include a file folder icon. A user generally intuitively knows a file folder icon contains one or more individual files. Another example of an interface metaphor may include one or more menus (e.g., drop-down menus), which a user generally intuitively knows to list functions that may be selected. Another example of an interface metaphor may include a button displayed on a touch-sensitive monitor screen. A user generally intuitively knows that upon pressing a button, an associated function may be initiated.

Models of Three-Dimensional Objects

The one or more three-dimensional objects may be represented by one or more models. The one or more models may function to digitally represent one or more three-dimensional objects. The one or more models may comprise collocated data. The one or more models may be segregated into objects and/or components that are labeled and connected to physical and operational attributes and to the history of thereof. The one or more models may visually display a visual signature, thermal signature, acoustic signature, vibration signature, chemical signature, or any combination thereof. The visual signature may construct a virtual point cloud. Virtual surfaces may be applied to the virtual point cloud. The model may include a shell model. Texture mapping may be applied to the virtual point cloud. A thermal signature, acoustic signature, vibration signature, chemical signature, or any combination thereof may be applied to the virtual surfaces of the model. The one or more models may include various models of the same objects, the various models having different resolutions. The resolution of a model may be selected based upon the type of computing device being used to view the model. For example, mobile phones typically have smaller memories and/or computing powers as compared to laptops. Accordingly, a lower resolution model may be viewed on a mobile phone and a higher resolution model may be viewed on a laptop.

The one or more models may be constructed from and/or comprise data derived from one or more types of a plurality of sensors. The one or models may be constructed by computer-executable instructions executed by one or more processors. The one or more models may be stored in one or more storage media. The one or more models may be displayed on a graphical user interface.

The one or more models may be viewable by a user. The one or more models may be explorable by a user. The one or more models may be explorable in real-time. Real-time may refer to a time substantially contemporaneous with the collection of data by a sensor apparatus and/or diagnostic device. A user may zoom-in on details of particular three-dimensional models. A user may view an entire space where a plurality of three-dimensional models may be situated. A user may manipulate the viewing angle of one or more three-dimensional models, a space where a plurality of three-dimensional models may be situated, or both. A user may view a particular three-dimensional model. A user may view a plurality of three-dimensional models simultaneously. A user may toggle between different three-dimensional models.

The one or more models may include one or more pre-fabricated three-dimensional models, one or more boundary models, one or more three-dimensional baseline models, one or more three-dimensional working models, one or more three-dimensional overlay models, or any combination thereof.

The one or models may include one or more pre-fabricated three-dimensional models. The one or more pre-fabricated three-dimensional models may function to represent one or more three-dimensional objects as provided by one or more original equipment manufacturers ("OEM"), in accordance with a planned construction, or both. The one or more pre-fabricated three-dimensional models may represent one or more three-dimensional objects as provided to a consumer.

The one or more pre-fabricated three-dimensional models may include models constructed by computer assisted design ("CAD") applications. The one or more pre-fabricated three-dimensional models may be constructed by OEMs, consumers, or both. The one or more pre-fabricated three-dimensional models may be stored in one or more storage media. The one or more pre-fabricated three-dimensional models may be stored in a database. The one or more pre-fabricated three-dimensional models may be stored in one or more database servers, application servers, or both. The one or more pre-fabricated three-dimensional models may be provided as a catalog. The catalog may be open-source. The catalog may be accessible by payment per model, payment per subscription, or both.

The one or more pre-fabricated three-dimensional models may be overlaid with one or more three-dimensional baseline models, three-dimensional working models, or both resulting in one or more three-dimensional overlay models. The one or more pre-fabricated three-dimensional models may be compared to one or more three-dimensional baseline models, three-dimensional working models, or both. The one or more pre-fabricated three-dimensional models may be compared to one or more three-dimensional baseline models, three-dimensional working models, or both to identify one or more three-dimensional objects associated with the one or more three-dimensional baseline models, three-dimensional working models, or both; to determine the existence of similarities and/or differences therebetween; to determine the presence of wear and tear of a three-dimensional object; to determine the extent of construction of a three-dimensional object; or any combination thereof.

The one or more pre-fabricated models may be free of extraneous data. Comparison of one or more pre-fabricated three-dimensional models to one or more three-dimensional baseline models, three-dimensional working models, or both may indicate extraneous data present in the one or more three-dimensional baseline models, three-dimensional working models, or both, which may be discarded.

The one or models may include one or more three-dimensional working models. The one or more three-dimensional working models may function to represent one or more three-dimensional objects at one or more points in time as sensed by a plurality of sensors. The one or more three-dimensional working models may include an identity of one or more three-dimensional objects associated with the one or more three-dimensional working models.

The one or more three-dimensional working models may represent one or more three-dimensional objects that have been and/or are currently operational. The one or more three-dimensional working models may be constructed from and/or comprised of data captured by a plurality of sensors. The one or more three-dimensional working models may be constructed from collocated data. The one or more three-dimensional working models may be constructed from data that has been processed by one or more processors according to computer-executable instructions associated with the method of the present disclosure. The one or more three-dimensional working models may be overlaid with one or more three-dimensional pre-fabricated three-dimensional models, three-dimensional baseline models, or both resulting in one or more three-dimensional overlay models.

The one or more three-dimensional working models may be stored in one or more storage media. The one or more three-dimensional working models may be stored in a database. The one or more three-dimensional working models may be accessible from one or more computing devices, database servers, application servers, or both. The one or more three-dimensional working models may be compared to one or more pre-fabricated three-dimensional models, three-dimensional baseline models, or both.

The one or models may include one or more three-dimensional baseline models. The one or more three-dimensional baseline models may function to represent one or more three-dimensional objects at one or more points in time as sensed by a plurality of sensors. The one or more three-dimensional baseline models may include one or more three-dimensional working models that have been designated as a baseline by a user. For example, a three-dimensional baseline model may be compared to one or more three-dimensional working models at subsequent points in time to determine how a three-dimensional object changes over time with respect to baseline.

The one or more three-dimensional baseline models may include an identity of one or more three-dimensional objects associated with the one or more three-dimensional baseline models. The one or more three-dimensional baseline models may represent one or more three-dimensional objects that have been and/or are currently operational. The one or more three-dimensional baseline models may be stored in one or more storage media. The one or more three-dimensional baseline models may be stored in a database. The one or more three-dimensional baseline models may be accessible from one or more computing devices, database servers, application servers, or both.

The one or more three-dimensional baseline models may be overlaid with one or more pre-fabricated three-dimensional models, three-dimensional working models, or both resulting in one or more three-dimensional overlay models. The one or more three-dimensional baseline models may be compared to one or more pre-fabricated three-dimensional models, three-dimensional working models, or both. The one or more three-dimensional baseline models may be compared to one or more three-dimensional working models in lieu of one or more pre-fabricated three-dimensional models.

The one or more three-dimensional baseline models may be free of extraneous data. Comparison of one or more three-dimensional baseline models to one or more three-dimensional working models may indicate extraneous data present in the one or more three-dimensional working models, which may be discarded.

The one or more models may include one or more three-dimensional overlay models. The one or more three-dimensional overlay models may function to communicate similarities and/or differences in one or more three-dimensional objects at one or more points in time.

The one or more three-dimensional overlay models may comprise an overlay of one or more pre-fabricated three-dimensional models, three-dimensional working models, three-dimensional baseline models, or any combination thereof. The one or more three-dimensional overlay models may represent one or more three-dimensional objects that have been and/or are currently operational. The one or more three-dimensional overlay models may include one or more visual indicators.

The one or more three-dimensional overlay models may be stored in one or more storage media. The one or more three-dimensional overlay models may be stored in a database. The one or more three-dimensional overlay models may be accessible from one or more computing devices, database servers, application servers, or both.

The one or more three-dimensional overlay models may indicate similarities and/or differences between the one or more three-dimensional objects at different points in time. The similarities and/or differences may include a plurality of attributes sensed by a plurality of sensors at two or more points in time.

The similarities and/or differences may include, but are not limited to, corrosion, gauge readings, location of three-dimensional objects, location of sub-components, presence or absence of three-dimensional objects, presence or absence of sub-components, presence or absence of one or more chemicals, thermal signature, acoustic signature, the like, or any combination thereof. For example, if an object that has developed corrosion between a first time and a second time, the corrosion may be identified from points in physical space and color; points in physical space that are present at a first time but not a second time; color that changes between a first time and a second time.

The gauge readings may be digital, analog, or both. For example, at a first time, an analog pressure gauge may have a dial pointing to 20 psi and at a second time, the analog pressure gauge may have a dial pointing to 30 psi.

The similarities and/or differences may be visually represented by one or more visual indicators. The similarities and/or differences may be summarized in a report. The report may be visual, verbal, or both.

The one or more three-dimensional overlay models may comprise one or more visual indicators. The one or more visual indicators may function to indicate similarities and/or differences between one or more three-dimensional objects at one or more points in time. The one or more visual indicators may assist users identify similarities and/or differences. For example, a user may review dozens or more of same or similar images of a three-dimensional object and similarities and/or differences that are sufficiently small may be easy for the user to overlook.

The one or more visual indicators may be overlaid on one or more models. The one or more visual indicators may be displayed on a graphical user interface. The one or more visual indicators may include color, icons, geometric boundaries, the like, or any combination thereof.

Color, as referred to with respect to one or more visual indicators, may be different from an actual color of one or more surfaces of the objects and/or subcomponents. The color may be arbitrarily chosen. The color may indicate an absolute deviation, a binary deviation, or both.

The absolute deviation may be visually represented by a color gradient. The color gradient may include one or more colors and one or more hues of the one or more colors. For example, hues of red may indicate differences between one or more three-dimensional objects at a first time and the same one or more three-dimensional objects at a second time while hues of blue may indicate similarities between one or more three-dimensional objects at a first time and the same one or more three-dimensional objects at a second time. The one or more hues may indicate a degree to which one or more three-dimensional objects at a first time are similar to or different from the same one or more three-dimensional objects at a second time. For example, lighter hues of blue may indicate higher degrees of similarity and darker hues of blue may indicate lower degrees of similarity.

The binary deviation may be visually represented by a color binary. The color binary may include one or more colors. One color may indicate differences between one or more three-dimensional objects at a first time and the same one or more three-dimensional objects at a second time while another color may indicate similarities between one or more three-dimensional objects at a first time and the same one or more three-dimensional objects at a second time. It may be particularly advantageous to represent similarities and/or differences by a color binary to reduce the visual complexity of the one or more three-dimensional overlay models and assist users to determine where similarities and/or differences exist on the one or more three-dimensional objects.

The one or more icons may include any suitable symbol shown on a graphical user interface. The one or more icons may be located on or adjacent to similarities and/or differences. The one or more icons may alert users to similarities and/or differences between one or more three-dimensional objects at a first time and the same one or more three-dimensional objects at a second time. The one or more geometric boundaries may circumscribe areas of similarities and/or differences.

A threshold may be utilized to determine which of the one or more colors, icons, geometric boundaries, or any combination thereof are visually represented. The threshold may be defined by a degree of difference mathematically represented by a percentage. For example, a measurable quantity that is 10% different or less may be represented by one color and a measurable quantity that is 11% or more different may be represented by another color.

The one or more models may be constructed from a data set, one or more data sub-sets thereof, or both. The data set and/or sub-set may comprise data associated with the plurality of attributes. The data set and/or sub-set may comprise data collected by a plurality of sensors. The data set and/or sub-set may be defined by a point in time when the data was collected.

The data set and/or sub-set may include extraneous data. As referred to herein, extraneous data may include data associated with objects and/or structures that are situated beyond one or more three-dimensional objects, data that is not associated with the one or more three-dimensional objects, or both. For example, an image of a three-dimensional object may include a view of any number of objects behind the three-dimensional object, which may not be pertinent to a user. Extraneous data may be discarded. It may be particularly advantageous to discard extraneous data in order to reduce the size of data in a model thereby avoiding occupying more data storage space than necessary, transmitting data sets faster, performing operations on data faster, avoiding exceeding bandwidth limitations, avoiding exceeding network data caps, or any combination thereof, relative to data sets including extraneous data. For example, deep sea oil rigs are typically restricted in an amount of bandwidth.

The extraneous data may include two-dimensional image data from which a three-dimensional model has already been extrapolated. For example, a plurality of two-dimensional images may be utilized to construct a model in three-dimensional space and after a point cloud has been constructed, the two-dimensional image data has served its purpose and is no longer needed. The extraneous data may include noise. The noise may include data that is corrupted, distorted, or has a low signal-to-noise ratio. The data set may be characterized by size. The size may be defined by the byte size of the data set.

The extraneous data may be designated by a user. The extraneous data may be designated based upon particular needs of a user. For example, in an environmentally controlled environment, corrosion may not be a concern to users so users may designate color data as extraneous.

The data set may be collocated resulting in a collocated data set. As referred to herein, collocating may refer to juxtaposing data from a plurality of sensors with a point cloud resulting in data associated with each of the plurality of attributes being assigned to points in physical space. Collocation may include projection, ray tracing, or both. Collocation may be performed autonomously. Collocated data may be arranged in one or more matrices.

Users may select to view a range of data or single data point. The range of data series or single data series may be viewable on a model. Users may toggle between different ranges or single data series. For example, an acoustic sensor may collect data associated with sound in a frequency range of between 20 Hz and 20,000 Hz and a user may select to view only data in a range of between 500 Hz and 2,000 Hz. Different ranges may reveal different properties of a three-dimensional object. For example, motor operation of a fluid pump may be discernable within a first frequency range and inlet and outlet fluid flow of the fluid pump may be discernable within a second frequency range. Selecting a range of data series or single data series may reveal attributes and/or properties of three-dimensional objects that would otherwise be indiscernible or obscured if viewing an entire data set collected by one or more sensors. For example, acoustic data in a particular frequency range may reveal whether fluid flow within a pipe is turbulent or laminar.

The one or more models may include one or more boundary models. The one or more boundary models may function to identify one or more three dimensional objects associated with one or more three-dimensional models. The one or more boundary models may comprise one or more geometric boundaries arranged in two-dimensional space, three-dimensional space, or both. The one or more geometric boundaries may indicate the general area and/or volume of space occupied by one or more three-dimensional objects.

The one or more geometric boundaries may encapsulate physical spaces occupied by each of the one or more three-dimensional objects. The one or more geometric boundaries may be defined by a length, a width, a height, one or more angles, or any combination thereof. The one or more geometric boundaries may be generally equal to the physical dimensions of the one or more three-dimensional objects. The physical dimensions of the one or more three-dimensional objects may include a length, a width, a height, one or more angles, or any combination thereof.

The one or more geometric boundaries may be larger than the physical dimensions of the one or more three-dimensional objects. A larger geometric boundary may be particularly advantageous in identifying, within a margin of error, one or more three-dimensional objects that are shifted and/or moved with respect to the one or more three-dimensional object's original position. The original position may be determined by one or more models. The one or more geometric boundaries may be 1% larger, 5% larger, or even 10% larger than the physical dimensions of the three-dimensional object.

The one or more geometric boundaries may be predetermined. The one or more geometric boundaries may be artificially drawn by a user. The one or more geometric boundaries may be autonomously drawn based on the physical dimensions of the one or more three-dimensional objects, one or more models, or both.

One or more points in physical space, captured by the plurality of sensors, attributed to the one or more three-dimensional objects may be overlaid onto the one or more boundary models. In this manner, one may determine the presence, absence, identity, or any combination thereof of the one or more three-dimensional objects. The determination of presence, absence, identity, or any combination thereof of the one or more three-dimensional objects may be performed on the basis of a quantitative measure of sensed points in physical space that lie within one or more geometric boundaries. A threshold may be set to determine whether the comparison of points in physical space to one or more geometric boundaries returns a positive identification or a failure of identification. The threshold may be represented as a percentage. For example, a threshold of a 90% match between points in physical space and one or more geometric boundaries may be set in order for a positive identification to be returned.

Method for Collocating Sensed Data of Three-Dimensional Objects

The method may comprise one or more of the following steps. Some of the steps may be duplicated, removed, rearranged relative to other steps, combined into one or more steps, separated into two or more steps, or any combination thereof.

As referred to herein, "first time", "second time", "third time", and so on may refer to a duration of time. The duration of time may be the length of time it takes one or more sensors to capture data of one or more three-dimensional objects. That is, typically data collection may be performed on a plurality of three-dimensional objects in a space. It may take minutes or even hours from the initiation of data collection until a sensor apparatus has completed data collection of the plurality of three-dimensional objects. For example, a sensor apparatus may traverse an entire factory.

The method of the present disclosure may be associated with computer-executable instructions stored on one or more non-transient storage media and executed by one or more processors. Reference to one or more storage media and one or more processors in the paragraphs that follow may refer to hardware local to or remote from one or more sensor apparatuses, docking stations, computing devices, database servers, application servers, diagnostic devices, or any combination thereof. It is also contemplated by the present disclosure that any combination of steps may be performed on hardware local to one of the one or more sensor apparatuses, docking stations, computing devices, database servers, diagnostic devices, or any combination thereof while any other combination of other steps may be performed on any other of the one or more sensor apparatuses, docking stations, computing devices, database servers, diagnostic devices, or any combination thereof.

The present disclosure provides for a method for collocating sensed data of one or more three-dimensional objects. The method may comprise acquiring a first data set at a first time. The first data set may be associated with a first plurality of attributes of the one or more three-dimensional objects. This step may be performed using a plurality of sensors that each acquire the first data set from a plurality of different positions of the plurality of sensors relative to one or more points in physical space on the one or more three-dimensional objects.

The method may comprise collocating the first data set resulting in a first collocated data set. The first collocated data set may correspond with one or more first three-dimensional working models of the one or more three-dimensional objects, respectively. This step may be performed by one or more processors. The one or more processors may be local to one or more sensor apparatuses, one or more docking stations, one or more computing devices, one or more application servers, or any combination thereof. This step may be performed autonomously. This step may include utilizing a neural network.

The method may comprise interpreting the first collocated data set, by comparison to one or more pre-fabricated three-dimensional models, to determine an identity of the one or more three-dimensional objects associated with the one or more first three-dimensional working models. This step may be performed by comparison, by the processor, of the one or more points in physical space on the one or more three-dimensional objects to a boundary model comprising pre-determined boundaries of the one or more three-dimensional objects within a space to determine the identity of the one or more three-dimensional objects. The pre-defined boundaries may be defined in two-dimensional space, in three-dimensional space, or both. This step may be performed by one or more processors. The one or more processors may be local to one or more sensor apparatuses, one or more docking stations, one or more computing devices, one or more application servers, or any combination thereof. This step may be performed autonomously. This step may include utilizing a neural network.

The method may comprise autonomously acquiring a second data set at a second time. The second data set may be associated with a second plurality of attributes of the one or more three-dimensional objects. This step may be performed using a plurality of sensors that each acquire the second data set from a plurality of different positions of the plurality of sensors relative to one or more points in physical space on the one or more three-dimensional objects. The second data set may be autonomously collected by a second plurality of sensors at the second time.

The method may comprise autonomously collocating the second data set resulting in a second collocated data set. The second collocated data set may correspond with one or more second three-dimensional working models of the one or more three-dimensional objects. This step may be performed by one or more processors. The one or more processors may be local to one or more sensor apparatuses, one or more docking stations, one or more computing devices, one or more application servers, or any combination thereof. This step may be performed autonomously. This step may include utilizing a neural network.

The method may comprise autonomously interpreting the second collocated data set, by comparison to the one or more pre-fabricated three-dimensional models and/or the one or more first three-dimensional working models, to determine the identity of the one or more three-dimensional objects associated with the one or more second three-dimensional working models. This step may be performed by comparison, by the processor, of the one or more points in physical space on the one or more three-dimensional objects to a boundary model comprising pre-determined boundaries of the one or more three-dimensional objects within a space to determine the identity of the one or more three-dimensional objects. The pre-defined boundaries may be defined in two-dimensional space, in three-dimensional space, or both. Advantageously, the comparison to determine identity may drastically reduce the amount of time and susceptibility to error involved with identification of objects via human visual inspection. This step may be performed by one or more processors. The one or more processors may be local to one or more sensor apparatuses, one or more docking stations, one or more computing devices, one or more application servers, or any combination thereof. This step may be performed autonomously. This step may include utilizing a neural network.

The method may comprise autonomously comparing the first collocated data set and the second collocated data set, respectively associated with a matching identity of the one or more three-dimensional objects to determine the existence of similarities and/or differences between the first collocated data set and the second collocated data set and thereby determine the existence of similarities and/or differences between the first plurality of attributes and the second plurality of attributes. This step may additionally or alternatively include autonomously comparing, by the processor, the second set of collocated data to the one or more pre-fabricated three-dimensional models associated with the matching identity of the one or more three-dimensional objects to determine the similarities and/or differences between the one or more pre-fabricated three-dimensional models relative to the second collocated data set. Advantageously, anomalies of a three-dimensional object that are relatively small in dimension or quantity may be identified by comparing models with sensed data. The second data set acquired last-in-time may be autonomously compared, by the processor, with any of one or more prior data sets. This step may be performed by one or more processors. The one or more processors may be local to one or more sensor apparatuses, one or more docking stations, one or more computing devices, one or more application servers, or any combination thereof. This step may be performed autonomously. This step may include utilizing a neural network.

Individual components of the collocated data sets may be autonomously compared. For example, only thermal data of two collocated data sets may be compared. More than one component of the collocated data sets may be autonomously compared, which may be otherwise referred to herein as a joint analysis. More than one component of the collocated data sets may characterize the same attribute of a three-dimensional object. For example, both a thermal signature and a vibrational signature may indicate an engine is operational.

While the collocating step and/or interpreting step may be recited herein together with other steps, not all steps are necessary or essential to be employed with the collocating step and/or interpreting step.

One or any combination of the above steps may be repeated for one or more iterations. The second data set may comprise data sets acquired last-in-time and the first data set may comprise data sets acquired prior to the data set acquired last-in-time. The first data set may comprise data sets acquired immediately prior to the data set acquired last-in-time.

The method may include a step of discarding extraneous data in the first data set and/or the second data set. The discarding step may be performed after one or both of the interpreting steps. The discarding step may be performed autonomously. The discarding step may be performed by a processor. The extraneous data may include data not being associated with the one or more three-dimensional objects. After the discarding step the first collocated data set may have a size that is less than a size of the first data set, the second collocated data set may have a size that is less than a size of the second data set, or both.

The method may include a step of combining data sub-sets. The step of combining data sub-sets may be performed independent of the collocating step. The step of combining data sub-sets may be performed before or after the collocating step. The data sub-sets may be associated with a particular sensor type. For example, data sub-sets comprising visual signatures of one or more three-dimensional objects may be combined and data sub-sets comprising acoustic signatures may be combined and thereafter the visual signatures and acoustic signatures may be collocated. The combining step may be performed autonomously. The combining step may be performed by a processor. The combining step may have the effect of compressing a size of and/or reducing noise of the first data set and/or the second data set.

The method may include a step of compensating for differences in illuminance with two-dimensional image data based on colocation of the two-dimensional image data through the one or more three-dimensional models. The differences in illuminance may include light incident on surfaces of the one or more three-dimensional objects, shadows cast onto the one or more three-dimensional objects, shadows cast by the one or more three-dimensional objects, or any combination thereof. The improved method of the present disclosure may utilize three-dimensional models to estimate which surfaces of the one or more three-dimensional objects have shadows cast upon them. In this manner, the comparison of two-dimensional image data to determine differences in illuminance between one point in time and another point in time is not obfuscated by shadows cast upon the one or more three-dimensional objects. The method may further include a step of compensating for differences in illuminance with two-dimensional data. As referred to herein, two-dimensional data may refer to visual data that is derived from one or more camera sensors at a discrete point in time. For example, the two-dimensional data may be derived from a still image from a video. The compensating step may be performed by one or more processors. The compensating step may be performed autonomously.

The method may include a step of compressing the first data set, the second data set, or both. The compressing step may be performed autonomously. The compressing step may be performed by a processor. The first data set, the second data set, or both may be compressed by about 100× or more, 300× or more, 500× or more, 700× or more, or even 900× or more. The first data set, the second data set, or both may be compressed by about 2000× or less, 1800× or less, 1600× or less, 1400× or less, or even 1200× or less. For example, a data set having a size of 5 GB may be compressed 1000× to a size of 5 MB.

The method may include a step of retrieving one or more pre-fabricated three-dimensional models. The retrieving step may be performed autonomously. The retrieving step may be performed by a processor. The one or more pre-fabricated three-dimensional models may each be associated with the identity of the one or more three-dimensional objects, respectively. The processor may retrieve the one or more pre-fabricated three-dimensional models from a storage medium. The storage medium may be local to one or more sensor apparatuses, docking stations, computing devices, database servers, diagnostic devices, or any combination thereof. The storage medium may be remote from one or more sensor apparatuses, docking stations, computing devices, diagnostic devices, or any combination thereof.

The method may include the steps of designating the one or more first three-dimensional working models as one or more three-dimensional baseline models, respectively; and receiving the identity of the one or more three-dimensional objects associated with the one or more three-dimensional baseline models. The designating and/or receiving steps may be performed by a user. The step of comparing may include comparing the second set of collocated data to the one or more three-dimensional baseline models to determine the identity of the three-dimensional object. The step of comparing may be performed autonomously. The step of comparing may be performed by a processor.

The method may include a step of extrapolating one or more properties, one or more operating conditions, or both from the first plurality of attributes, the second plurality of attributes, or both. The extrapolating step may be performed autonomously. The extrapolating step may be performed by one or more processors.

The method may include a step of overlaying the pre-fabricated three-dimensional model, the one or more first three-dimensional working models, the one or more second three-dimensional working models, or any combination thereof resulting in a three-dimensional overlay model. The method may further include a step of displaying visual indicators of the similarities and/or differences on a visual reproduction of the one or more three-dimensional models. The overlaying step, the displaying step, or both may be performed autonomously. The overlaying step, the displaying step, or both may be performed upon a user's command. The overlaying step may be performed by one or more processors. The displaying step may be performed by a graphical user interface. A user may toggle between different visual reproductions, each showing one or more of the plurality of attributes. A user may explore the visual reproduction of the one or more three-dimensional models. The visual reproduction may be explorable in real-time. The visual reproduction may be explorable via the graphical user interface. The method may further include a step of summarizing differences into a report.

The method may include a step of interpreting the first collocated data set and/or the second collocated data set to determine an identity of one or more three-dimensional sub-components of the one or more three-dimensional objects. The determining step may be performed upon determining the identity of the one or more three-dimensional objects. The interpreting step may be performed autonomously. The interpreting step may be performed upon a user's command. The interpreting step may be performed by a processor.

Figure 4:
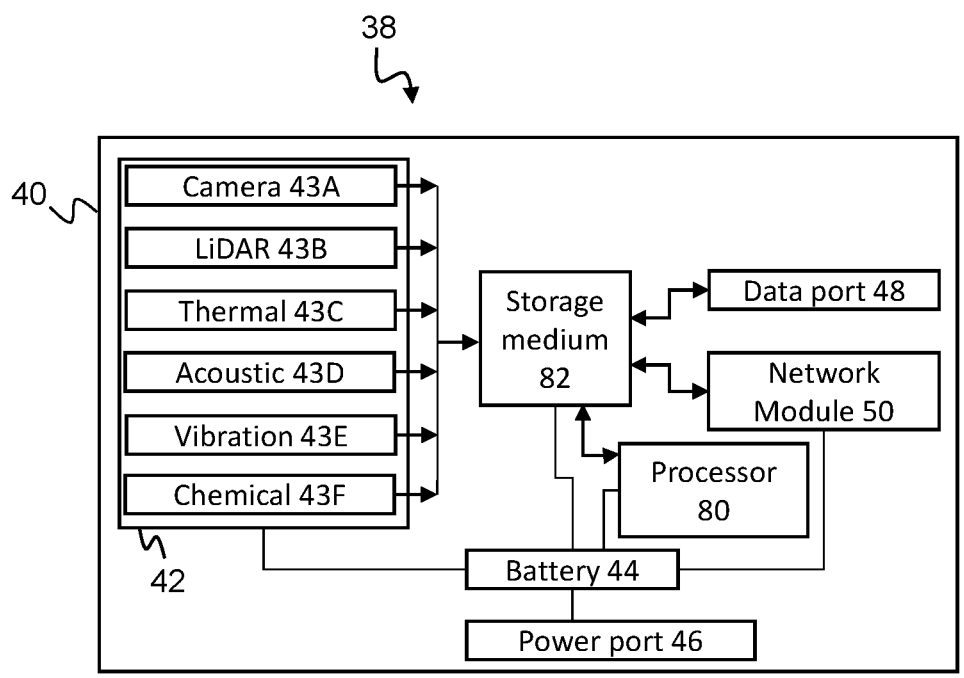
FIG. 4 illustrates a schematic of a sensor apparatus.

FIG. 1 shows a plan view of a roving operation 200 of a sensor apparatus 40. Three-dimensional objects 10 are statically located within and spatially distributed throughout a space 16. One of the three-dimensional objects 10 comprises a three-dimensional sub-component 12 and an interface 24 is situated therebetween. Surrounding spaces 26 are located adjacent to and surrounding the three-dimensional objects 10. The three-dimensional objects 10, the three-dimensional sub-component 12, the interface 24, and the surrounding spaces 26 are sensed by the sensor apparatus 40. The sensor apparatus 40 departs from a docking station 60 and traverses a path 68 that extends around perimeters 20 of the three-dimensional objects 10. A plurality of sensors 42, such as shown in FIG. 4, captures data associated with the three-dimensional objects 10 at a plurality of different positions that lie along the path 68 as the sensor apparatus 40 traverses the path 68. At an end of the path 68, the sensor apparatus 40 returns to the docking station 60.

Figure 2:
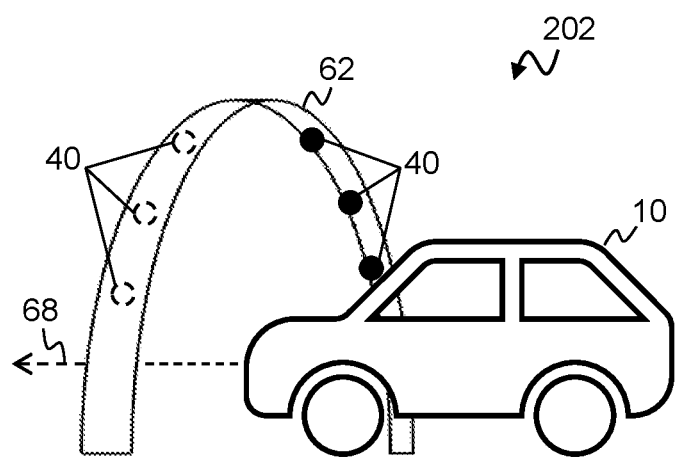
FIG. 2 shows a perspective view of a stationary operation of a plurality sensor apparatuses.

FIG. 2 shows a perspective view of a stationary operation 202 of a plurality sensor apparatuses 40. The plurality of sensor apparatuses 40 are statically mounted to a frame 62. A three-dimensional object 10 traverses a path 68 that passes by the plurality of sensor apparatuses 40. Each of the plurality of sensor apparatuses 40 include a plurality of sensors 42, such as shown in FIG. 4. The plurality of sensors 42 capture data associated with the three-dimensional object 10 as the three-dimensional object 10 traverses the path 46.

Figure 3:
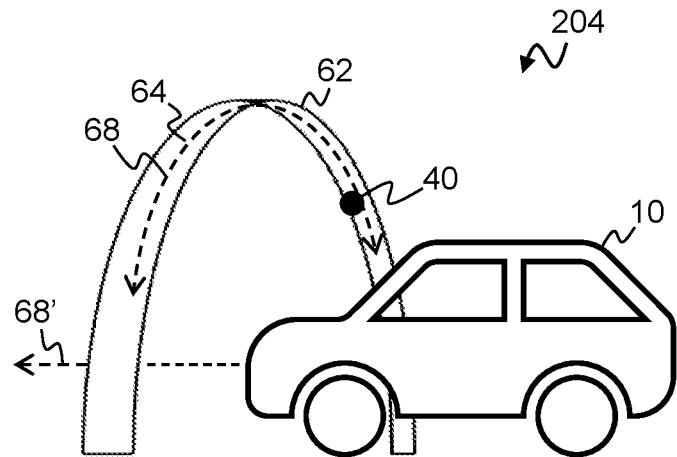
FIG. 3 shows a perspective view of a mutually relative motion operation of a sensor apparatus.

FIG. 3 shows a perspective view of a mutually relative motion operation 204 of a sensor apparatus 40. The sensor apparatus 40 is movably mounted to a frame 62 and the sensor apparatus 40 is movable along a track 64 of the frame 62. The track 64 guides the sensor apparatus 40 along a path 68. The sensor apparatus 40 includes a plurality of sensors 42, such as shown in FIG. 4. A three-dimensional object 10 traverses another path 68' that passes by the sensor apparatus 40. During operation, the sensor apparatus 40 and the three-dimensional object 10 traverse their respective paths 68, 68' and the plurality of sensors 42 captures data associated with the three-dimensional object 10.

Figure 6:
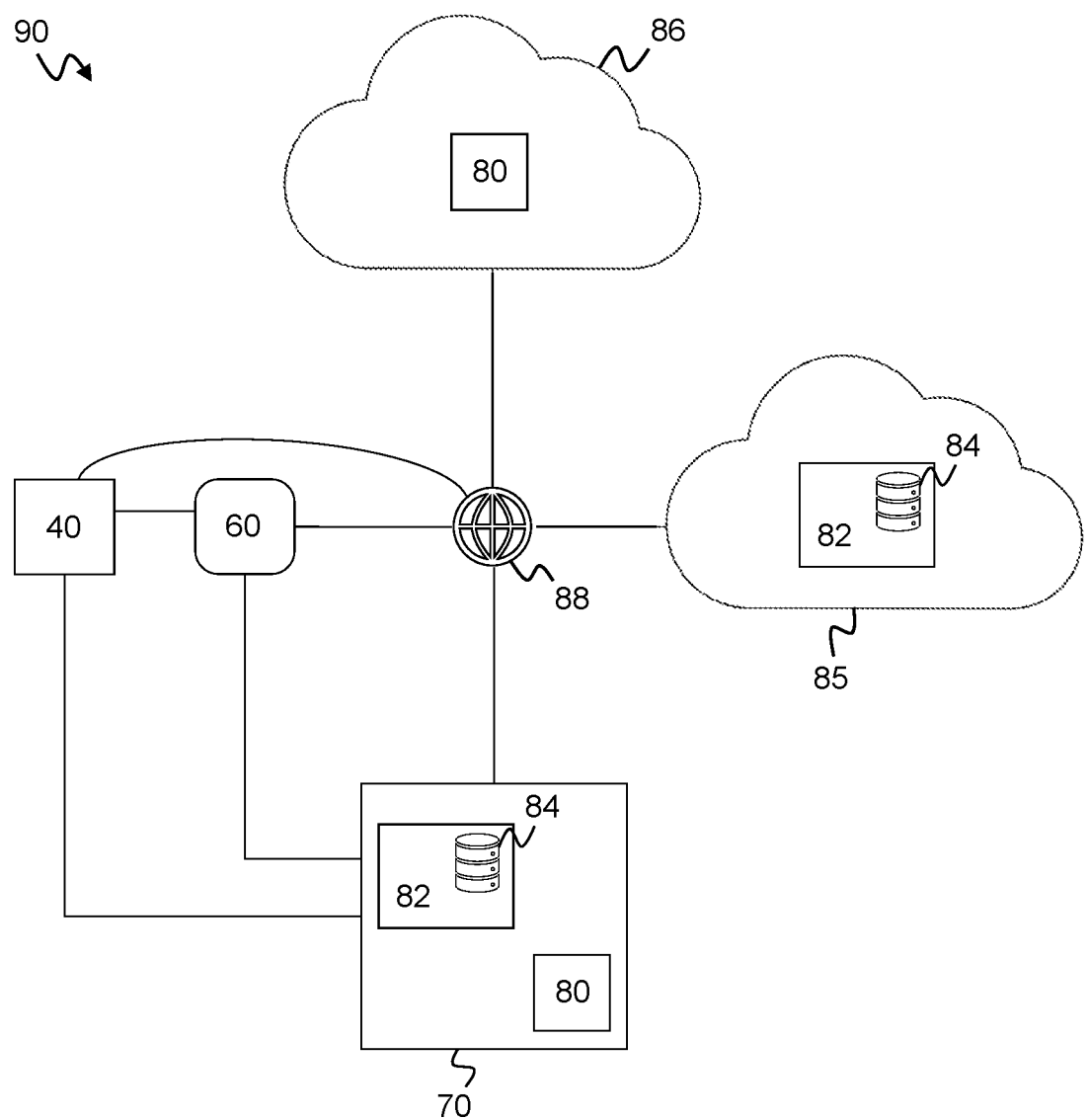
FIG. 6 illustrates a data collection and processing system.

FIG. 4 illustrates a schematic of a sensor apparatus 40. The sensor apparatus 40 comprises a plurality of sensors 42 including a camera sensor 43A, a LiDAR sensor 43B, a thermal sensor 43C, an acoustic sensor 43D, a vibration sensor 43E, and a chemical sensor 43F. The plurality of sensors 42 capture data associated with one or more three-dimensional objects, as illustrated in FIGS. 1-3. The data is transmitted from the plurality of sensors to a storage medium 82. The storage medium 82 is in communication with a processor 80, a data port 48, a network module 50. The processor 80 retrieves the data from the storage medium 82 and performs operations on the data. The data port 48 can transmit the data to a docking station 60, a computing device 70, or a network 88, such as shown in FIG. 6, via a wired connection. The network module 50 can transmit the data to a docking station 60, a computing device 70, or a network 88, such as shown in FIG. 6, via a wireless connection. The plurality of sensors 42, the processor 80, the storage medium 82, and the network module 50 are powered by a battery 44. The battery 44 is re-chargeable via a power port 46.

Figure 5:
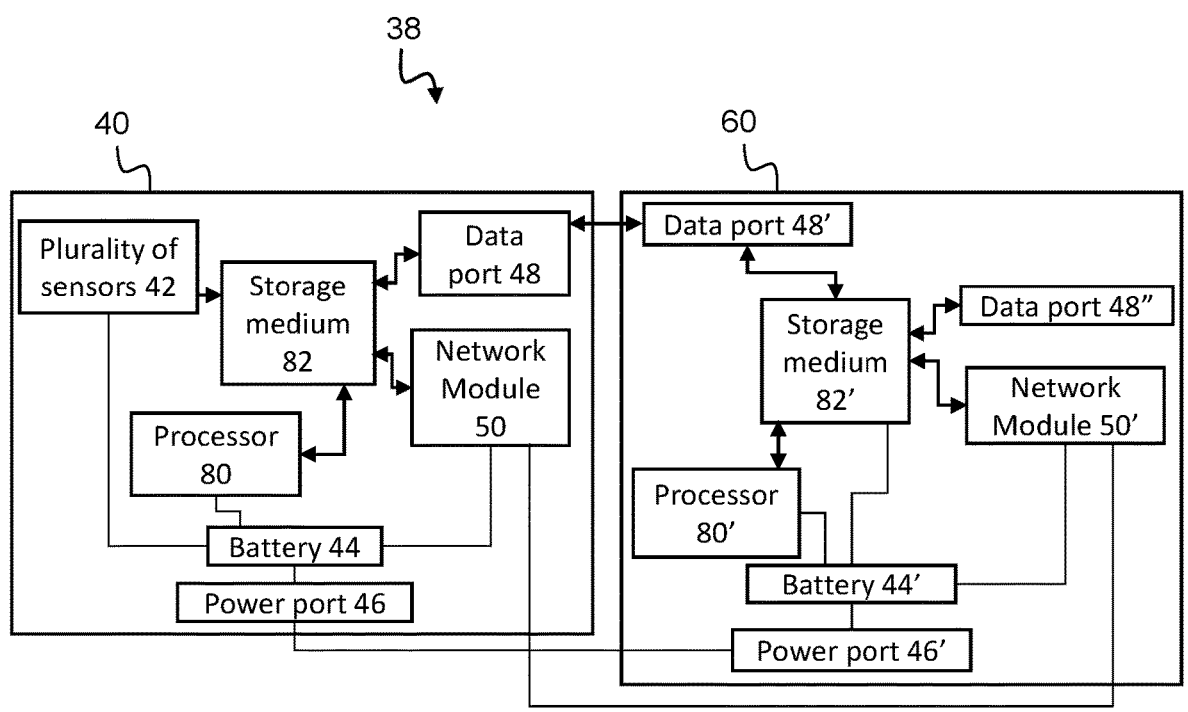
FIG. 5 illustrates a schematic of sensor apparatus and a docking station.

FIG. 5 illustrates a schematic of a sensor apparatus 40 and a docking station 60. The sensor apparatus includes a plurality of sensors 42, a processor 80, a storage medium 82, a data port 48, a network module a battery 44, and a power port 46. The data is transmitted from the plurality of sensors to a storage medium 82. The storage medium 82 is in communication with a processor 80, a data port 48, a network module 50. The processor 80 receives the data from the storage medium 82 and performs operations with the data. The data port 48 receives the data from the storage medium 82 and transmit the data to a data port 48' of a docking station 60 via a wired connection. The network module 50 receives the data from the storage medium 82 and transmits the data to a network module 50' of a docking station 60 via a wireless connection. The plurality of sensors 42, the processor 80, the storage medium 82, and the network module 50 are powered by a battery 44. The battery 44 is re-chargeable via a power port 46.

The docking station 60 includes a processor 80', a storage medium 82', two data ports 48', 48'', a network module 50', a battery 44', and a power port 46'. The docking station 60 receives the data by either or both of the data port 48' and the network module 50'. The data can be stored in the storage medium 82'. A processor 80' receives the data from the storage medium 82' and performs operations with the data. The docking station 60 can transmit the data to a computing device 70, or a network 88, such as shown in FIG. 6, via a wired connection via the data port 48''. The docking station 60 can transmit the data to a computing device 70, or a network 88, such as shown in FIG. 6, via a wireless connection via the network module 50'. The processor 80', the storage medium 82', and the network module 50' of the docking station 60 are powered by a battery 44' that is chargeable via a power port 46'. The battery 44 of the sensor apparatus 40 can be charged via the power port 46' of the docking station 60.

FIG. 6 illustrates a data collection and processing system 38. The data collection and processing system 38 comprises a sensor apparatus 40, a docking station 60, a computing device 70, a database server 85, and an application server 86, all of which are connected via a network 88. Data collected by the sensor apparatus 40 during the course of the operations such as illustrated in FIGS. 1-3 is communicated to the docking station 60, the computing device 70, the database server 85, the application server 86, or any combination thereof. The computing device 70 and the database server 85 comprise storage media 82 including databases 84 for storing the data. The computing device 70 and the application server 86 comprise processors 80 for performing operations with the data.

Figure 7A:
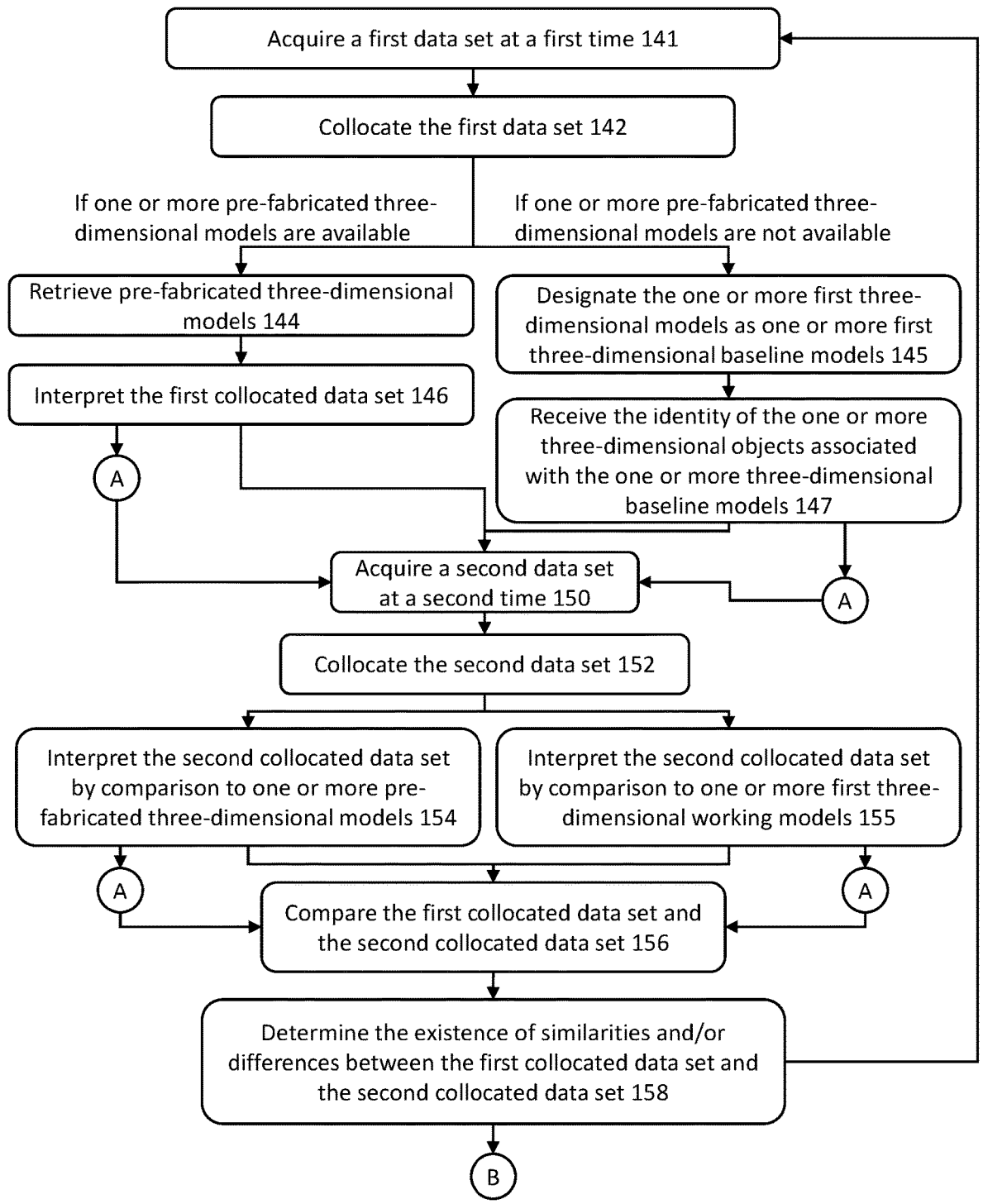
FIG. 7A illustrates a method for collocating sensed data of one or more three-dimensional objects.

FIG. 7A illustrates a method for collocating sensed data of one or more three-dimensional objects. The method includes the steps of acquiring a first data set at a first time 141 and collocating the first data set 142, which corresponds with one or more first three-dimensional working models.

If one or more pre-fabricated three-dimensional models are available, the method includes proceeding to retrieve the one or more pre-fabricated three dimensional models 144 and then interpreting the first collocated data set 146 utilizing the one or more pre-fabricated three-dimensional models to determine an identity of the one or more first three-dimensional working models.

If the one or more pre-fabricated three-dimensional models are not available, the method included proceeding to designating the one or more first three-dimensional models as one or more first three-dimensional baseline models 145 and receiving the identity of the one or more three-dimensional objects associated with the one or more three-dimensional baseline models 147.

Figure 7B:
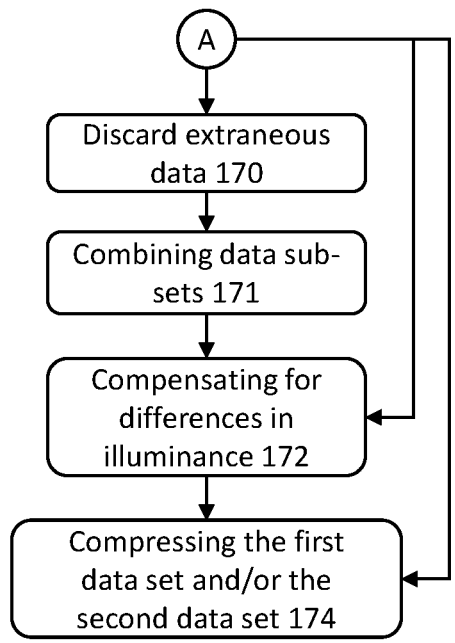
FIG. 7B illustrates a method for collocating sensed data of one or more three-dimensional objects.

After the steps 146 or 147, the method optionally includes the steps such as illustrated in FIG. 7B. After the steps 146 or 147, or the steps such as illustrated in FIG. 7B, the method includes acquiring a second data set at a second time 150 and collocating the second data set 152, which corresponds with one or more second three-dimensional working models.

The second data set can be interpreted by either or both of comparison to one or more pre-fabricated three-dimensional models 154 and comparison to one or more first three-dimensional working models 155. After the steps 154 or 155, the method optionally includes the steps such as illustrated in FIG. 7B. After the steps 154 or 155, or the steps illustrated in FIG. 7B, the method includes comparing the first collocated data set and the second collocated data set 156 and determining the existence of similarities and/or differences between the first collocated data set and the second collocated data set 158. After step 158, the method optionally includes the steps such as illustrated in FIG. 7C.

FIG. 7B illustrates a method for collocating sensed data of one or more three-dimensional objects. The method optionally includes discarding extraneous data 170, compensating for differences in illuminance 172, compressing the first data set and/or the second data set 174, or any combination thereof.

Figure 7C:
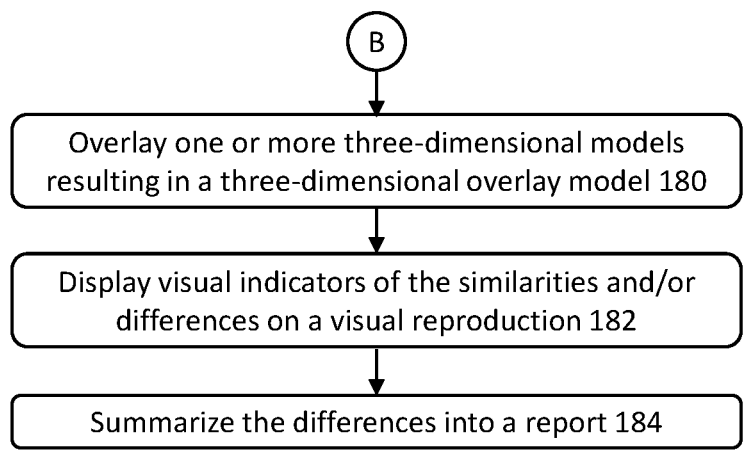
FIG. 7C illustrates a method for collocating sensed data of one or more three-dimensional objects.

FIG. 7C illustrates a method for collocating sensed data of one or more three-dimensional objects. The method optionally includes overlaying one or more three-dimensional models—including the pre-fabricated three-dimensional model, the one or more first three-dimensional working models, the one or more second three-dimensional working models—resulting in a three-dimensional overlay model 180. The method further optionally includes displaying visual indicators of the similarities and/or differences on a visual reproduction of the one or more three-dimensional models 182. The method further optionally includes summarizing the differences into a report 184.

Figure 8:
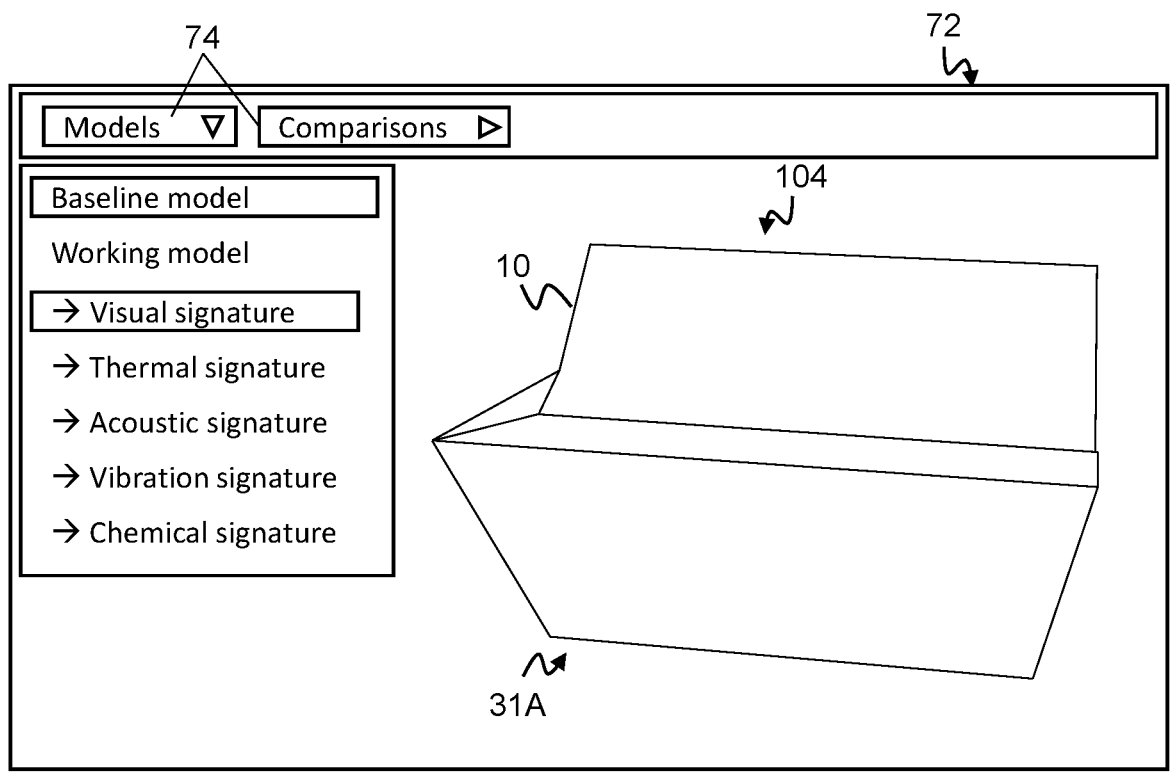
FIG. 8 illustrates a graphical user interface.
Figure 9:
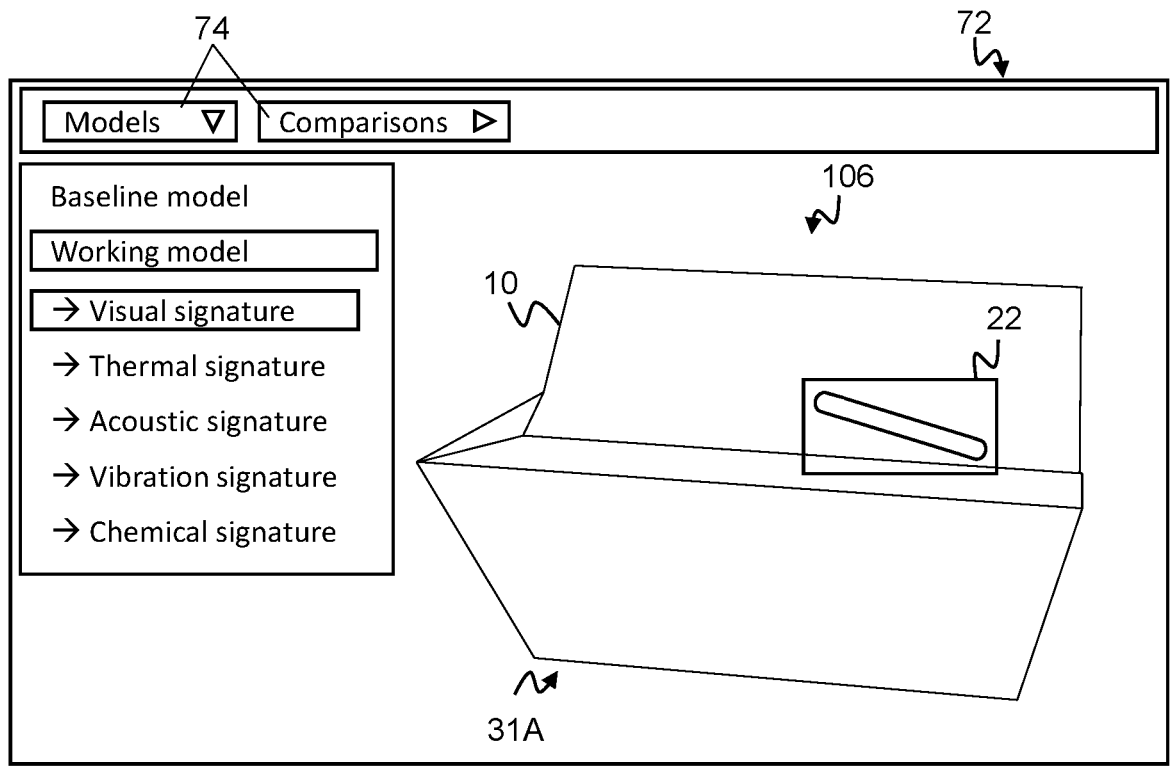
FIG. 9 illustrates a graphical user interface.
Figure 10:
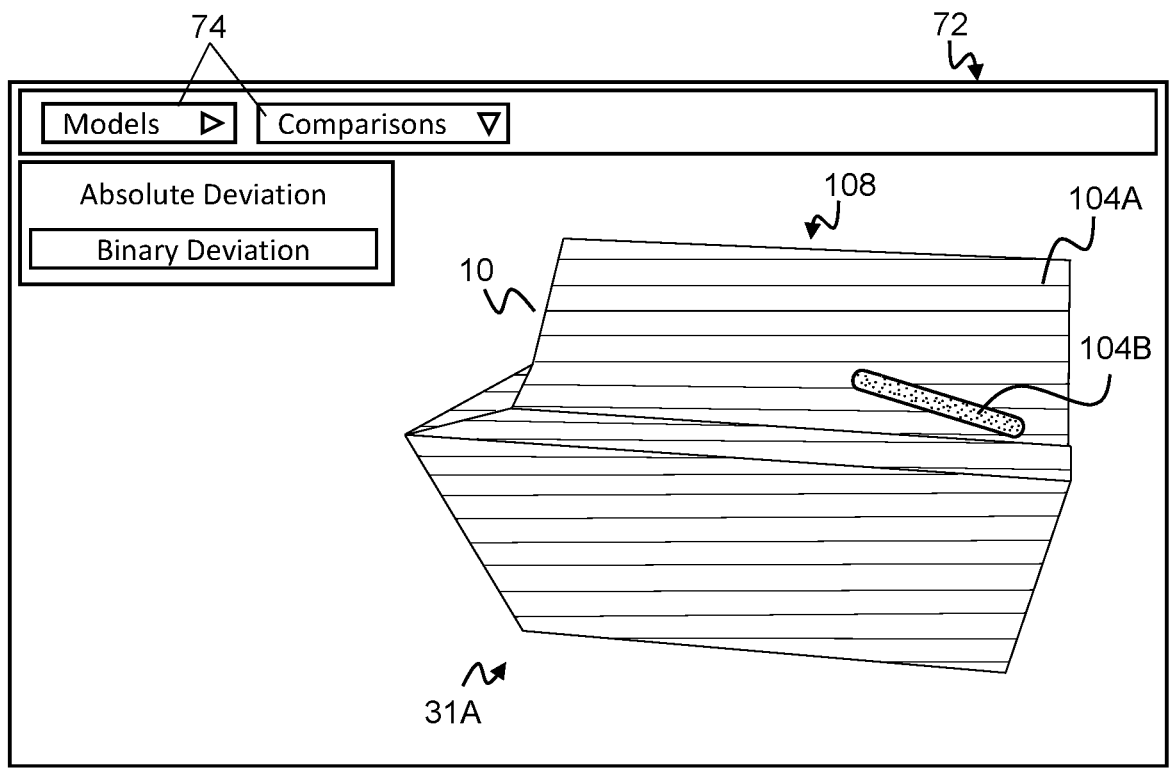
FIG. 10 illustrates a graphical user interface.

FIGS. 8-10 illustrates a graphical user interface 72. The graphical user interface 72 of FIG. 8 displays a three-dimensional baseline model 104 of a three-dimensional object 10. The data embodied by the three-dimensional baseline model 104 is a first data set that was captured by a sensor apparatus 40, such as shown in FIG. 4, at a first time 67A. The data is associated with points in physical space 31A.

The graphical user interface 72 of FIG. 9 graphically displays a three-dimensional working model 106 of a three-dimensional object 10. The data embodied by the three-dimensional working model 106 is a second data set that was captured by the sensor apparatus 40 at a second time 67B. The data is associated with points in physical space 31A. The three-dimensional working model 106, shown in FIG. 9, includes an additional component, circumscribed by a rectangle in the illustration, as compared to the three-dimensional baseline model 104, such as shown in FIG. 8. In particular, a pen was placed on the three-dimensional object 10 at a time between the first time 67A and the second time 67B.

The first data set and the second data set can be overlaid, resulting in a three-dimensional overlay model 108, to assist an observer identify the difference between the three-dimensional baseline model 104 and the three-dimensional working model 106.

As shown in FIG. 10, a binary deviation is visually represented on the three-dimensional overlay model 108 by a color binary, whereby a second color 140B (represented by stippling) is easily discernable from a first color 140A (represented by horizontal lines). The first color 140A represents surfaces of the three-dimensional working model 106 that are similar to the same surfaces of the three-dimensional baseline model 104. The second color 140B represents surfaces of the three-dimensional working model 106 that are different from the same surface of the three-dimensional baseline model 104.

A user can toggle between the three-dimensional baseline model 104, the three-dimensional working model 106, and the three-dimensional overlay model 108 showing binary deviation by interacting with drop-down menus 74.

FIGS. 11-14 illustrates a graphical user interface 72. The graphical user interface 72 of FIG. 11 displays a three-dimensional baseline model 104 of a three-dimensional object 10. The particular views illustrated may be toggled between by a user by interacting with the drop-down menus. The data embodied by the three-dimensional baseline model 104 is a first data set that was captured by a sensor apparatus 40, such as shown in FIG. 4 at a first time 67A. The data is associated with points in physical space 31A and a thermal signature 31D. The three-dimensional object 10 illustrated is a mini-van. The body of the mini-van has a generally uniform thermal signature 31D (represented by horizontal line fill) while the windows of the mini-van have a generally uniform thermal signature 31D (represented by diagonal line fill) but different from the thermal signature 31D of the body.

Figure 11:
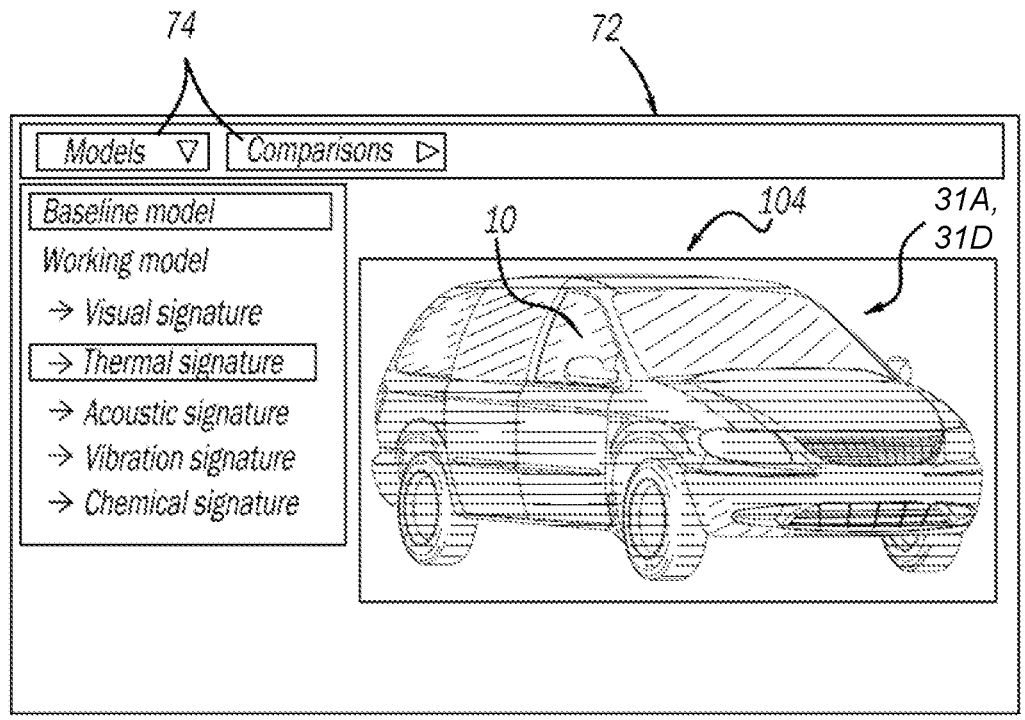
FIG. 11 illustrates a graphical user interface.
Figure 12:
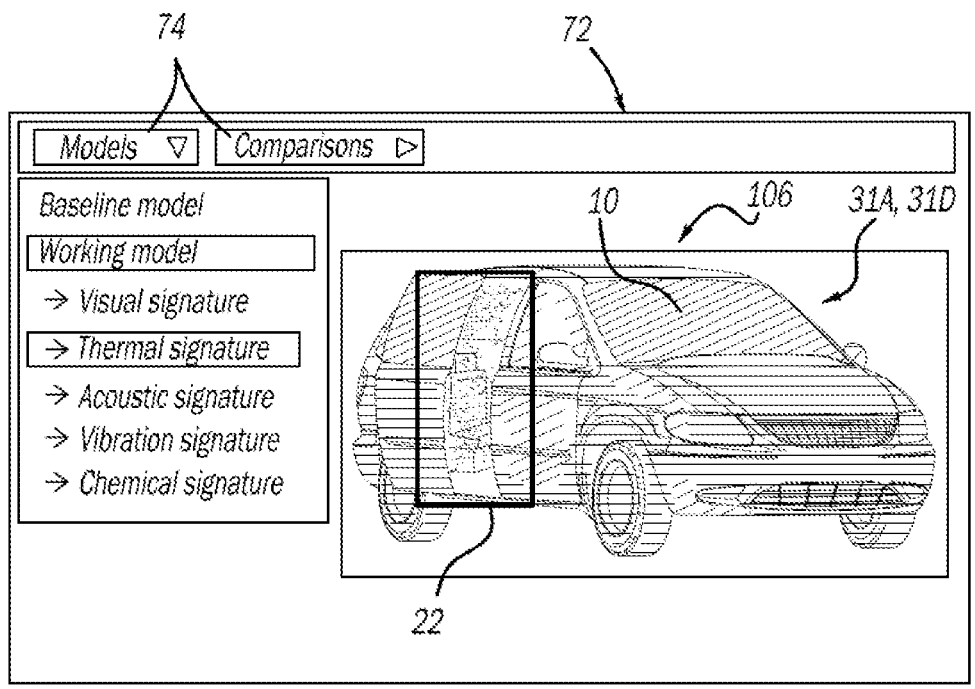
FIG. 12 illustrates a graphical user interface.

The graphical user interface 72 of FIG. 12 graphically displays a three-dimensional working model 106 of the three-dimensional object 10. The data embodied by the three-dimensional working model 106 is a second data set that was captured by the sensor apparatus 40 at a second time 67B. The data is associated with points in physical space 31A and a thermal signature 31D. A surface 22 of the three-dimensional working model 106, such as shown in FIG. 12, is different as compared to the three-dimensional baseline model 104, such as shown in FIG. 11. In particular, a sliding door of the three-dimensional object 10, which is illustrated as a mini-van, was opened at a time between the first time 67A and the second time 67B. The positional shift of the door exposes the interior of the mini-van. As illustrated in FIG. 12, the interior of the mini-van provides a different thermal signature 31D (represented by stippling) as compared to the thermal signature 31D of the external surfaces of the van, which are illustrated with horizontal and diagonal lines. The first data set and the second data set can be overlaid, resulting in a three-dimensional overlay model 108, to assist an observer identify the difference between the three-dimensional baseline model 104 and the three-dimensional working model 106.

Figure 13:
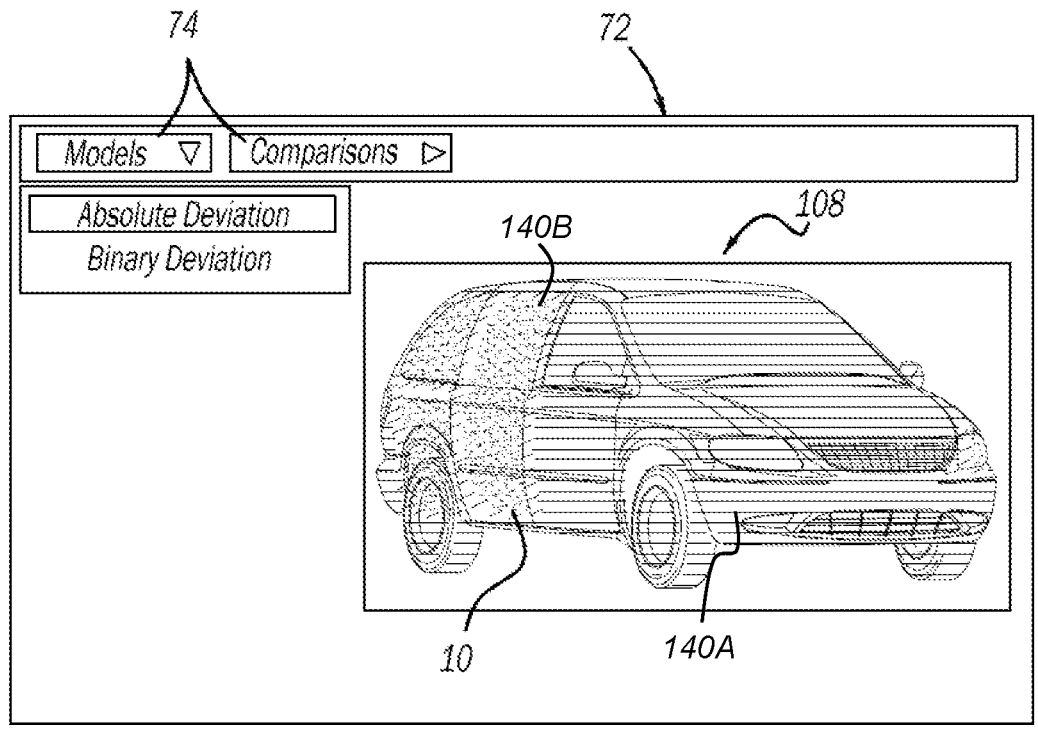
FIG. 13 illustrates a graphical user interface.

As shown in FIG. 13, an absolute deviation is visually represented on the three-dimensional overlay model 108 by a color gradient, whereby hues of a second color 140B (represented by stippling and diagonal lines around the boundaries of the stippling) are easily discernable from hues of a first color 140A (represented by horizontal lines). The hues of the first color 140A represent thermal signatures 31D of the three-dimensional working model 106 that are similar to the thermal signatures 31D of the three-dimensional baseline model 104. The hues of the second color 140B represent thermal signatures 31D of the three-dimensional working model 106 that are different from the thermal signatures 31D of the three-dimensional baseline model 104. Each particular hue of the first color 140A on the color gradient is determined by the degree of similarity. Each particular hue of the second color 140B on the color gradient is determined by the degree of difference.

Figure 14:
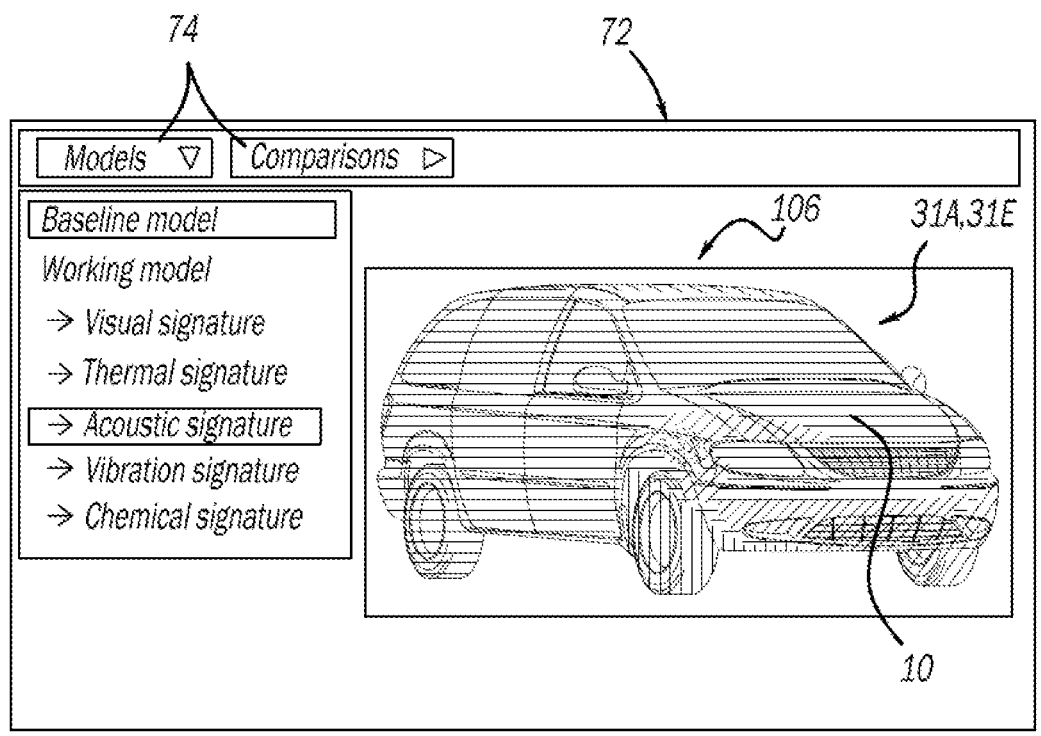
FIG. 14 illustrates a graphical user interface.

FIG. 14 illustrates a graphical user interface 72. The graphical user interface 72 displays a three-dimensional working model 106 of a three-dimensional object 10. The data embodied by the three-dimensional working model 106 was captured by a sensor apparatus 40, such as shown in FIG. 4. The data is associated with points in physical space 31A and an acoustic signature 31E. The three-dimensional object 10, which is illustrated as a mini-van, comprises an acoustic signature 31E comprising areas of relatively higher acoustic intensity, represented by vertical lines, diagonal lines, and stippling, and areas of relatively lower acoustic intensity, represented by horizontal lines. The areas of relatively higher acoustic intensity vary in intensity. That is, stippling conveys a higher acoustic intensity relative to diagonal lines and the diagonal lines convey a higher acoustic intensity relative to vertical lines. As a result, a user can determine the operating condition of the three-dimensional object 10. The three-dimensional working model 106 conveys to a user that the engine of the mini-van is operational. The acoustic energy from the engine is being translated to the front quarter panel, hood, fender, and front wheels.

Figure 15:
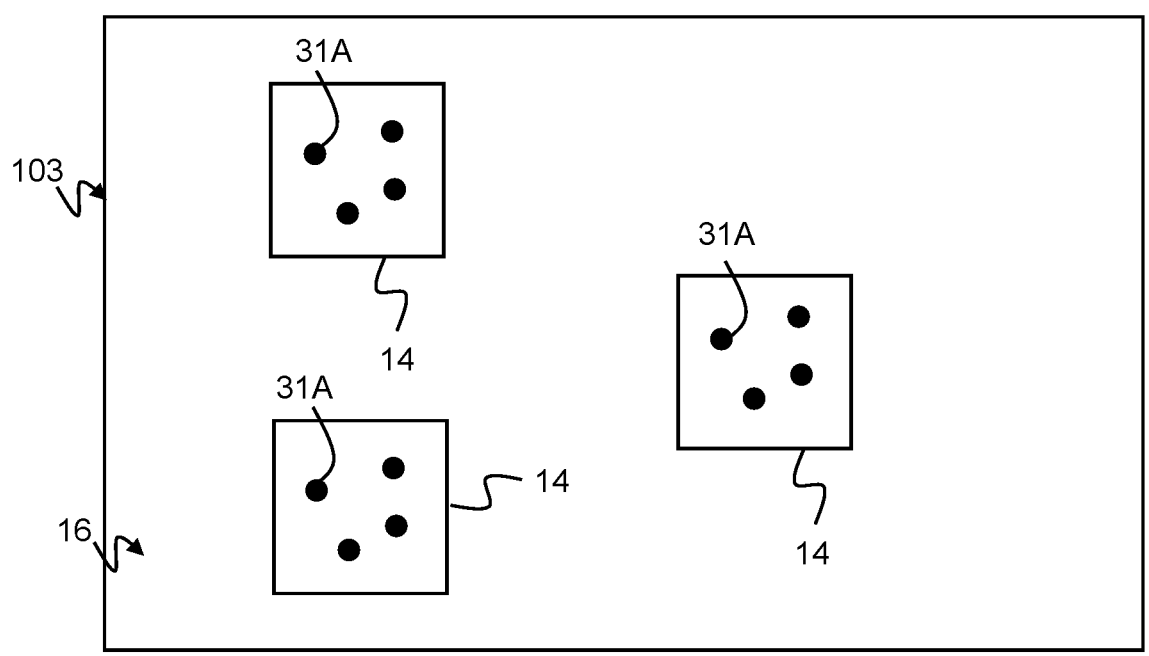
FIG. 15 illustrates a boundary model.

FIG. 15 illustrates a boundary model 103. The boundary model 103 includes a space 16 and three pre-fabricated boundaries 14 distributed therethrough. The boundary model 103 is overlaid with points in physical space 31A captured by the sensor apparatus 40, such as shown in FIG. 1. The points in physical space 31A are situated within the several pre-fabricated boundaries 14, which indicates to a user the identities of the three-dimensional objects 10, such as shown in FIG. 1, associated with the points in physical space 31A.

It is understood that any of the method steps can be performed in virtually any order. Moreover, one or more of the method steps can be combined with other steps; can be omitted or eliminated; can be repeated; and/or can be separated into individual or additional steps.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value is from 1 to 90, from 20 to 80, or from 30 to 70, it is intended that intermediate range values (such as for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. Unless otherwise stated, all ranges include both endpoints.

The use of "about" or "approximately" in connection with a range applies to both ends of the range. Thus, "about 20 to 30" is intended to cover "about 20 to about 30", inclusive of at least the specified endpoints.

The terms "generally" or "substantially" to describe measurements may mean about +/−10° or less, about +/−5° or less, or even about +/−1° or less. The terms "generally" or "substantially" to describe measurements may mean about +/−0.01° or greater, about +/−0.1° or greater, or even about +/−0.5° or greater.

REFERENCE NUMERALS

10—Three-dimensional object; 12—Three-dimensional subcomponents; 14—Pre-determined boundary; 16—Space; 20—Perimeter; 22—One or more surfaces; 24—One or more interfaces; 26—One or more surrounding spaces; 30—Plurality of attributes; 31A—Points in physical space; 31B—Color; 31C—Illuminance; 31D—Thermal signature; 31E—Acoustic signature; 31F—Vibration signature; 31G—Chemical signature; 32—Identity; 34—One or more properties; 36—One or more operating conditions; 38—Data collection and processing system; 40—Sensor apparatus; 42—Plurality of sensors; 43A—Camera sensor; 43B—LiDAR sensor; 43C—Thermal sensor; 43D—Acoustic sensor; 43E—Vibration sensor; 43F—Chemical sensor; 44—Battery; 46—Power port; 48—Data port; 50—Network module; 52—Location module; 60—Docking station; 62—Frame; 64—Track; 66—Plurality of different positions; 67A—First time; 67B—Second time; 68—Path; 70—Computing device; 72—Graphical user interface; 74—Menu; 80—Processor; 82—Storage medium; 84—Database; 85—Database server; 86—Application server; 88—Network; 100—Catalog; 102—Pre-fabricated three-dimensional model; 103—Boundary model; 104—Three-dimensional baseline model; 106—Three-dimensional working model; 108—Three-dimensional overlay model; 109—Visual reproduction; 110—Data set; 111—Data sub-set; 112—Collocated data set; 120—Size; 122—Noise; 124—Similarity; 126—Difference; 130—Visual indicator; 131—Absolute deviation; 132—Color gradient; 134—Binary deviation; 136—Color binary; 138A—First hue; 138B—Second hue; 138C—Third hue; 140A—First color; 140B—Second color.

141—Acquire a first data set at a first time; 142—Collocate the first data set; 144—Retrieve pre-fabricated three-dimensional models; 145—Designate the one or more first three-dimensional models as one or more first three-dimensional baseline models; 146—Interpret the first collocated data set; 147—Receive the identity of the one or more three-dimensional objects associated with the one or more three-dimensional baseline models; 150—Acquire a second data set at a second time; 152—Collocate the second data set; 154—Interpret the second collocated data set by comparison to one or more pre-fabricated three-dimensional models; 155—Interpret the second collocated data set by comparison to one or more first three-dimensional working models; 156—Compare the first collocated data set and the second collocated data set; 158—Determine the existence of similarities and/or differences between the first collocated data set and the second collocated data set; 170—Discard extraneous data; 171—Combining data sub-sets; 172—Compensating for differences in illuminance; 174—Compressing the first data set and/or the second data set; 180—Overlay one or more three-dimensional models resulting in a three-dimensional overlay model; 182—Display visual indicators of the similarities and/or differences on a visual reproduction; 184—Summarize the differences into a report; 200—Roving operation; 202—Stationary operation; 204—Mutually relative motion operation.

What is claimed is:

1. A method for analyzing sensed data of one or more three-dimensional objects, the method comprising the following steps:
    (a) effectuating relative movement during a first time period between a sensor apparatus comprising a plurality of sensors and the one or more three-dimensional objects and acquiring, using the plurality of sensors and for a plurality of relative positions between the sensor apparatus and the one or more three-dimensional objects, a first data set associated with a plurality of attributes of the one or more three-dimensional objects;
    (b) autonomously collocating, by at least one processor, the first data set to generate a first collocated data set that corresponds with one or more first three-dimensional working models of the one or more three-dimensional objects;
    (c) autonomously interpreting, by the at least one processor, the first collocated data set, to determine an identity of one or more three-dimensional subcomponents of the one or more three-dimensional objects associated with the one or more first three-dimensional working models, and identifying one or more properties of the one or more three-dimensional subcomponents for the first time period;
    (d) effectuating relative movement during a second time period between the sensor apparatus and the one or more three-dimensional objects and acquiring, using the plurality of sensors and for a plurality of relative positions between the sensor apparatus and the one or more three-dimensional objects, a second data set associated with the plurality of attributes of the one or more three-dimensional objects;
    (e) autonomously collocating, by the at least one processor, the second data set to generate a second collocated data set that corresponds with one or more second three-dimensional working models of the one or more three-dimensional objects;
    (f) autonomously interpreting, by the at least one processor, the second collocated data set, to determine an identity of the one or more three-dimensional subcomponents of the one or more three-dimensional objects associated with the one or more second three-dimensional working models, and identifying one or more properties of the one or more three-dimensional subcomponents for the second time period;
    (g) autonomously comparing, by the at least one processor, the first collocated data set and the second collocated data set, respectively associated with a matching identity of the one or more three-dimensional subcomponents to determine an existence of similarities and/or differences between the first collocated data set and the second collocated data set and thereby determine an existence of similarities and/or differences in the plurality of attributes between the first time period and the second time period; and (h) alerting a user to differences in the one or more properties of the one or more three-dimensional subcomponents that occurred between the first time period and the second time period.

2. The method of claim 1, wherein one or more of the following items (i) and (ii) include utilizing a neural network: (i) the autonomously interpreting steps, and (ii) the autonomously comparing step.

3. The method of claim 1, wherein:
the autonomously interpreting of the first collocated data set to determine the identity of one or more three-dimensional subcomponents of the one or more three-dimensional objects associated with the one or more first three-dimensional working models comprises comparison to one or more pre-fabricated three-dimensional models; and
the autonomously interpreting of the second collocated data set to determine the identity of one or more three-dimensional subcomponents of the one or more three-dimensional objects associated with the one or more second three-dimensional working models comprises comparison to the one or more pre-fabricated three-dimensional models and/or the one or more first three-dimensional working models.

4. The method of claim 1, wherein
the autonomously collocating of the first data set comprises one or more of: juxtaposing the first data set with a point cloud, projecting attributes onto surfaces of the one or more three-dimensional subcomponents, or ray tracing of attributes onto surfaces of the one or more three-dimensional subcomponents; and
the autonomously collocating of the second data set comprises one or more of: juxtaposing the first data set with a point cloud, projecting of attributes onto surfaces of one or more subcomponents, or ray tracing of attributes onto surfaces of the one or more three-dimensional subcomponents.

5. The method of claim 1, wherein the plurality of sensors includes a camera sensor, a thermal sensor, and a chemical sensor.

6. The method of claim 5, wherein the plurality of sensors further includes one or more of: a global positioning system (GPS) sensor, a LiDAR sensors, and a laser interferometer sensor.

7. The method of claim 1, wherein the one or more pre-fabricated three-dimensional models comprise three-dimensional models constructed with computer assisted design software by one or more original equipment manufacturers.

8. The method of claim 1, further comprising retrieving, by the at least one processor, the one or more pre-fabricated three-dimensional models from at least one storage medium.

9. The method of claim 1, wherein the plurality of attributes comprises includes: a visual signature, an acoustic signature, a thermal signature, a vibration signature, a chemical signature, or any combination thereof.

10. The method of claim 1, wherein the one or more properties includes: one or more physical conditions of the one or more three-dimensional subcomponents, one or more operating conditions of the one or more three-dimensional subcomponents, one or more physical conformations of the one or more three-dimensional subcomponents, or any combination thereof.

11. The method of claim 1, wherein after one or both of the interpreting steps, the method further includes a step of autonomously discarding extraneous data in the first data set and/or the second data set, the extraneous data not being associated with the one or more three-dimensional subcomponents; and wherein after the autonomously discarding step, the first collocated data set has a size that is less than a size of the first data set, the second collocated data set has a size that is less than a size of the second data set, or both.

12. The method of claim 1, wherein the plurality of different positions is distanced from the one or more three-dimensional objects by no more than 30 meters.

13. The method of claim 1, wherein the effectuating relative movement steps comprise moving the sensor apparatus relative to the one or more three-dimensional objects.

14. The method of claim 1, wherein the sensor apparatus is mounted to an autonomous roving device, and the moving of the sensor apparatus relative to the one or more three-dimensional objects comprises moving the autonomous roving device relative to the one or more three-dimensional objects.

15. The method of claim 1, further comprising autonomously compensating, by the processor, for differences in illuminance with two-dimensional image data of the first data set and of the second data set based on collocation of the two-dimensional image data through any one or more of the first three-dimensional working model and the second three-dimensional working model.

16. The method of claim 1, further comprising:
designating, by a user, the one or more first three-dimensional working models as one or more three-dimensional baseline models, respectively; and
receiving, from a user, the identity of the one or more three-dimensional subcomponents associated with the one or more three-dimensional baseline models; and
wherein the autonomously comparing step includes autonomously comparing, by the processor, the second collocated data set to the one or more three-dimensional baseline models to determine the identity of the one or more three-dimensional subcomponents.

17. The method of claim 1, wherein the alerting comprises:
overlaying, by the at least one processor, the one or more pre-fabricated three-dimensional models, the one or more first three-dimensional working models, the one or more second three-dimensional working models, or any combination thereof, resulting in a three-dimensional overlay model; and
displaying to the user, by a graphical user interface, visual indicators of the differences in the one or more properties of the one or more three-dimensional subcomponents on a visual reproduction of the one or more three-dimensional models.

18. The method of claim 17, wherein the visual indicators comprise:
an absolute deviation whereby the differences in the one or more properties are represented by a color gradient, and/or
a binary deviation whereby the differences in the one or more properties are represented by a color binary.

19. The method of claim 17, wherein the visual indicators comprise one or more qualitative verbal descriptors.

20. The method of claim 17, wherein the visual indicators comprise at least one of the following items (i) and (ii): (i)

one or more icons on or adjacent to areas exhibiting differences in the one or more properties of the one or more three-dimensional subcomponents, and (ii) one or more geometric boundaries circumscribing areas exhibiting differences in the one or more properties of the one or more three-dimensional subcomponents.

21. The method of claim 17, wherein the visual reproduction of the one or more three-dimensional models is explorable by a user via the graphical user interface.

22. The method of claim 1, wherein the sensor apparatus comprises a mobile phone configured to provide a graphical user interface and to receive user inputs.

\* \* \* \* \*